US010326131B2

(12) United States Patent
Mitlin

(10) Patent No.: US 10,326,131 B2
(45) Date of Patent: Jun. 18, 2019

(54) ANODES FOR BATTERIES BASED ON TIN-GERMANIUM-ANTIMONY ALLOYS

(71) Applicant: David Mitlin, Hannawa Falls, NY (US)

(72) Inventor: David Mitlin, Hannawa Falls, NY (US)

(73) Assignee: Sparkle Power LLC, Rochester, NY (US)

( * ) Notice: Subject to any disclaimer, the term of this patent is extended or adjusted under 35 U.S.C. 154(b) by 462 days.

(21) Appl. No.: 15/082,746

(22) Filed: Mar. 28, 2016

(65) Prior Publication Data

US 2016/0285089 A1    Sep. 29, 2016

Related U.S. Application Data

(60) Provisional application No. 62/138,723, filed on Mar. 26, 2015.

(51) Int. Cl.
| | |
|---|---|
| *H01M 4/38* | (2006.01) |
| *H01M 4/134* | (2010.01) |
| *H01M 10/0525* | (2010.01) |
| *H01M 10/054* | (2010.01) |
| *H01M 4/02* | (2006.01) |

(52) U.S. Cl.
CPC .......... *H01M 4/387* (2013.01); *H01M 4/134* (2013.01); *H01M 10/054* (2013.01); *H01M 10/0525* (2013.01); *H01M 2004/021* (2013.01)

(58) Field of Classification Search
None
See application file for complete search history.

(56) References Cited

U.S. PATENT DOCUMENTS

| 4,795,695 A | * | 1/1989 | Pan ........................ G11B 7/243 346/135.1 |
|---|---|---|---|
| 7,534,528 B2 | | 5/2009 | Kawakami et al. |
| 7,722,991 B2 | | 5/2010 | Zhang et al. |
| 7,745,047 B2 | | 6/2010 | Zhamu et al. |
| 2004/0131936 A1 | | 7/2004 | Turner et al. |
| 2005/0250008 A1 | | 11/2005 | Mizutani et al. |
| 2006/0057463 A1 | | 3/2006 | Gao et al. |
| 2006/0099512 A1 | | 5/2006 | Nakai et al. |
| 2011/0052986 A1 | | 3/2011 | Barker et al. |
| 2011/0086269 A1 | | 4/2011 | Yamaguchi et al. |

(Continued)

FOREIGN PATENT DOCUMENTS

| WO | 2005076389 A2 | 8/2005 |
|---|---|---|
| WO | 2014081786 A1 | 5/2014 |

OTHER PUBLICATIONS

Behdokht Farbod, et al., "Anodes for Sodium Ion Batteries Based on Tin-Germanium-Antimony Alloys", ACS Nano, Apr. 2014, pp. 4415-4429.

(Continued)

*Primary Examiner* — Jonathan Crepeau
(74) *Attorney, Agent, or Firm* — Murtha Cullina LLP

(57) ABSTRACT

An anode for a battery including an electrochemically active material including a ternary alloy of tin (Sn), germanium (Ge), and antimony (Sb). A battery including the anode, a cathode, a separator, and an electrolyte. The ternary alloy may include $Sn_xGe_ySb_z$, where $x+y+z=100$, and $x \geq y$ or $x \geq z$. The alloy may include a multiphase microstructure with an amorphous phase and nanocrystalline phase, each of the phases being ion active.

23 Claims, 18 Drawing Sheets

(56) References Cited

U.S. PATENT DOCUMENTS

| | | |
|---|---|---|
| 2012/0082894 A1 | 4/2012 | Takada et al. |
| 2013/0143120 A1 | 6/2013 | Ramasubramanian et al. |
| 2013/0183583 A1 | 7/2013 | Kim et al. |
| 2013/0260232 A1 | 10/2013 | Lu et al. |
| 2013/0295433 A1 | 11/2013 | Chang et al. |
| 2013/0316223 A1 | 11/2013 | Lee et al. |

OTHER PUBLICATIONS

Thorne, et al., "(Cu6Sn5)1-xCxactive/inactive nanocomposite negative electrodes forNa-ion batteries", Electrochimica Acta 112 (2013) 133-137.

Wu, et al., "A Sn—SnS—C nanocomposite as anode host materials for Na-ion batteries", J. Mater. Chem. A, 2013, 1, pp. 7181-7184.

Hou, et al., "Antimony nanoparticles anchored on interconnected carbon nanofibers networks as advanced anode material for sodium-ion batteries", Journal of Power Sources 284 (2015) 227-235.

Darwiche, et al., "Better Cycling Performances of Bulk Sb in Na-Ion Batteries Compared to Li-Ion Systems: An Unexpected Electrochemical Mechanism", J. Am. Chem. Soc. 2012, 134, 20805-20811.

Baggetto, et al., "Characterization of sodium ion electrochemical reaction with tin anodes: Experiment and theory", Journal of Power Sources 234 (2013) 48-59.

Yamamoto, et al., "Charge-discharge behavior of tin negative electrode for a sodium secondary battery using intermediate temperature ionic liquid sodium bis(fluorosulfonyl) amide-potassium bis(fluorosulfonyl)amide", Journal of Power Sources 217 (2012), pp. 479-484.

Baggetto,et al., "Cu2Sb thin films as anode for Na-ion batteries", Electrochemistry Communications 27 (2013) 168-171.

Xu, et al., "Electrochemical Performance of Porous Carbon/Tin Composite Anodes for Sodium-Ion and Lithium-Ion Batteries", Adv. Energy Mater. 2013, 3, 128-133.

Nam, et al., "Electrochemical synthesis of a three-dimensional porous Sb/Cu2Sb anode for Na-ion batteries", Journal of Power Sources 247 (2014) 423-427.

Zhu, et al., "Electrospun Sb/C Fibers for a Stable and Fast Sodium-Ion Battery Anode", ACS Nano, 2013, 7 (7), pp. 6378-6386.

Baggetto, et al., "Germanium as negative electrode material for sodium-ion batteries", Electrochemistry Communications 34 (2013) 41-44.

Qian, et al., "High capacity Na-storage and superior cyclability of nanocomposite Sb/C anode for Na-ion batteries", Chem. Commun., 2012, 48, 7070-7072.

Xiao, et al., "High capacity, reversible alloying reactions in SnSb/C nanocomposites for Na-ion battery applications", Chem. Commun., 2012, 48, 3321-3323.

Baggetto, et al., "Predictions of particle size and lattice diffusion pathway requirements for sodium-ion anodes using η-Cu6Sn5 thin films as a model system", Phys.Chem. Chem. Phys., 2013, pp. 10885-10894.

Fan, et al., "Rapid fabrication of a novel Sn—Ge alloy: structure-property relationship and its enhanced lithium storage properties", J. Mater. Chem. A, 2013, 1, pp. 14577-14585.

Ellis, et al., "Reversible Insertion of Sodium in Tin", Journal of the Electrochemical Society, 159 (11) A1801-A1805 (2012).

Wu, et al.,"Sb—C nanofibers with long cycle life as an anode material for high-performance sodium-ion batteries", Energy Environ. Sci., 2014, 7, 323-328.

Lin, et al., "Sn—Cu Nanocomposite Anodes for Rechargeable Sodium-Ion Batteries", ACS Appl. Mater. Interfaces 2013, 5, 8273-8277.

Ellis, et al., "Sodium Insertion into Tin Cobalt Carbon Active/Inactive Nanocomposite", Journal of The Electrochemical Society, 160 (6), pp. A869-A872 (2013).

Datta, et al., "Tin and graphite based nanocomposites: Potential anode for sodium ion batteries", Journal of Power Sources 225 (2013) 316-322.

Liu, et al., "Tin-Coated Viral Nanoforests as Sodium-Ion Battery Anodes", ACS Nano, 2013, 7 (4), pp. 3627-3634.

Abel, et al., "Tin-Germanium Alloys as Anode Materials for Sodium-Ion Batteries", ACS Appl. Mater. Interfaces 2014, 5, 15860-15867.

Liu, et al., "Ultrasmall Sn Nanoparticles Embedded in Carbon as High-Performance Anode for Sodium-Ion Batteries", Adv. Funct. Mater. 2015, 25, 214-220.

\* cited by examiner

ANODES FOR BATTERIES BASED ON TIN-GERMANIUM-ANTIMONY ALLOYS

FIELD OF THE INVENTION

The present invention relates to anode compositions for batteries, and more particularly to anodes with alloys of tin, germanium, and antimony and secondary batteries including the same.

BACKGROUND OF THE INVENTION

Lithium ion batteries (LIBs) are the dominant secondary (rechargeable) energy storage source for portable and electric vehicle applications. Sodium (Na) ion batteries (referred to as NIBs or SIBs) have attracted scientific attention as alternatives to LIBs, since sodium is more readily available than lithium and has a potential for significant associated cost reduction. Moreover, NIBs are considered as the key technology for meeting large-scale energy storage needs, mainly due to much more geographically democratic availability of Na and lower cost as compared to Li. NIBs also offer an increased resistance to metal plating-induced shorts. The standard electrode potential is determined by the redox couple and by the ion solvation interactions, with the difference between Li and Na standard potentials in carbonate solvents being in the range 0.2-0.25 V.

In LIBs, there is a wide diversification of cathode materials from $LiCoO_2$ to other Li-transition metal oxides such as spinel $LiMn_2O_4$ and Li-transition metal phosphates, especially $LiFePO_4$, as well as improved and safer electrolyte chemistries. However, for anodes, graphite is still the primary material in commercial Li-ion batteries having been this way since their introduction.

Likewise, several classes of cathode materials have been proposed for NIBs, including $Na_{0.44}MnO_2$, $Na_{0.85}Li_{0.17}Ni_{0.21}Mn_{0.64}O_2$, $Na_{0.7}CoO_2$, $Na_3V_2(PO_4)_2F_3$, $Na_2FePO_4F$, $LiFeSO_4F$, and $Na_{4-\alpha}M_{2+\alpha/2}(P_2O_7)_2$ ($\frac{2}{3} \leq \alpha \leq \frac{7}{8}$), M=Fe, $Fe_{0.5}Mn_{0.5}$, Mn), olivines, and NASICONs. NIB anodes, on the other hand, present more of a challenge since commercial graphite has very low Na storage capacity. Charge storage capacities and cycling stabilities approaching LIB graphite have been demonstrated for various amorphous or partially graphitic carbons. Anodes based on titanium oxide, such as $Na_2Ti_3O_7$ and anatase $TiO_2$, have also been successfully employed. These are highly desirable from a cost and environmental friendliness perspective, while offering capacities of ~150 mAhg$^{-1}$ (milliamp-hour per gram) and good cycling stability. These materials along with the carbons represent perhaps the most economical anode option for large-scale stationary applications.

Other group 14 elements, besides carbon, have potentially higher storage capacities for lithium and sodium. According to the equilibrium phase diagram, tin (Sn) can store 3.75 Na/host-atom ($Na_{15}Sn_4$), with a resulting maximum charge storage capacity of 847 mAhg$^{-1}$. The experimentally measured capacity of Sn anodes generally approach this value early in testing, but degrades during cycling. For instance, Yamamoto et al. reported a NIB negative electrode based on a Sn thin film with a discharge (charge) capacity of 790 (729) mAhg$^{-1}$ in the first cycle. However, this electrode showed a rapid capacity decay after 15 cycles. Ellis et al. also observed an initial discharge capacity of ~850 mAhg$^{-1}$ for a sputtered Sn electrode and a rapid cycling-induced capacity degradation to near zero. Sn-based alloy composites have been reported to exhibit improved cycling stability, such as $(Sn_{0.5}Co_{0.5})_{1-x}C_x$ alloy, $(Cu_6Sn_5)_{1-x}C_x$, SnSb/C nanocomposite, $Cu_6Sn_5$, $Sn_{0.9}Cu_{0.1}$ alloy, and Sn—SnS—C nanocomposite.

Antimony (Sb) has also been recently examined for its potential as a NIB anode. The maximum stoichiometry of Na—Sb alloys is $Na_3Sb$, giving Sb a theoretical capacity of 660 mAhg$^{-1}$. Sb alloy and intermetallic electrodes have been examined, including $Cu_2Sb$ with a capacity of 280 mAhg$^{-1}$, AlSb with a capacity of 490 mAhg$^{-1}$, $Mo_3Sb_7$ with a capacity of 330 mAhg$^{-1}$, and Sb-MWCNT nanocomposites with a capacity of ~500 mAhg$^{-1}$. Germanium (Ge) in thin film form or as porous nanocolumnar structures has been demonstrated to work as a NIB anode as well. Experimental capacities in the range 1:1 NaGe (369 mAhg$^{-1}$) have been reported.

While binary and several ternary (containing C) Sn- and Sb-based alloys have been examined as potential NIB anodes, little is known regarding Ge-containing systems.

It is desired to develop new anode materials for lithium ion and sodium ion batteries to achieve higher capacity.

SUMMARY OF THE INVENTION

Accordingly, it is an object of the present invention to provide anodes for batteries including tin, germanium, and/or antimony alloys. It is a further object of the present invention to provide anodes with ternary Sn—Ge—Sb thin film alloys. It is a further object to provide a battery including such anodes.

It is a further object of the present invention to provide an anode that achieves a multiphase amorphous-nanocrystalline microstructure with all phases being ion active. It is a further object of the present invention to provide anodes with high storage capacity.

These and other objects are achieved by providing an anode for a battery including an electrochemically active material including a ternary alloy of tin (Sn), germanium (Ge), and antimony (Sb). In one embodiment, the alloy include $Sn_xGe_ySb_z$, where x+y+z=100, and x≥y or x≥z. In one embodiment, y is about equal to z. In some embodiments, the alloy includes a two-phase structure including an amorphous phase and nanocrystalline phase.

In some embodiments, the anode has a charge storage capacity that exceeds a rule of mixture capacity of individual elements, tin (Sn), germanium (Ge), and antimony (Sb).

Further provided is a battery including a cathode, at least one separator, an anode, the anode comprising an electrochemically active material comprising a ternary alloy of tin (Sn), germanium (Ge), and antimony (Sb), and an electrolyte. In one embodiment, the battery is a lithium-ion battery. In another embodiment, the battery is a sodium-ion battery. In other embodiments, the battery is one of a magnesium-ion battery and a potassium-ion battery.

The alloy of the anode in the battery may include a multiphase microstructure with an amorphous phase and nanocrystalline phase, each of the phases being ion active. In another embodiment, the alloy includes a multiphase microstructure, wherein one of the phases is a supersaturated solid solution with a lattice parameter different from equilibrium. The alloy may also include at least one ion-active non-oxide, non-nitride, non-carbon phase.

In some embodiments, the anode of the battery has a charge storage capacity that exceeds a rule of mixture capacity of individual elements, tin (Sn), germanium (Ge), and antimony (Sb).

Other objects of the invention and its particular features and advantages will become more apparent from consideration of the following drawings and accompanying detailed description.

BRIEF DESCRIPTION OF THE DRAWINGS

The following drawings form part of the specification and are included to further demonstrate certain embodiments or various aspects of the invention. In some instances, embodiments of the invention can be best understood by referring to the accompanying drawings in combination with the detailed description presented herein. The description and accompanying drawings may highlight a certain specific example, or a certain aspect of the invention. However, one skilled in the art will understand that portions of the example or aspect may be used in combination with other examples or aspects of the invention.

DETAILED DESCRIPTION OF THE INVENTION

As used herein, the recited terms have the following meanings. All other terms and phrases used in this specification have their ordinary meanings as one of skill in the art would understand. Such ordinary meanings may be obtained by reference to technical dictionaries, such as *Hawley's Condensed Chemical Dictionary* 14$^{th}$ Edition, by R. J. Lewis, John Wiley & Sons, New York, N.Y., 2001.

To the extent that the following description is of a specific embodiment or a particular use of the invention, it is intended to be illustrative only, and not limiting of the claimed invention. The following description is intended to cover all alternatives, modifications and equivalents that are included in the spirit and scope of the invention, as defined in the appended claims.

The present invention relates to anodes for batteries and more specifically to thin film-based ternary Sn—Ge—Sb alloy anodes and batteries incorporating the same. The invention is applicable to secondary ion batteries and particularly lithium-ion and sodium ion batteries. The present invention also relates to microstructures of such alloys and particularly a multiphase microstructure including an amorphous phase and nanocrystalline phase, each of the phases being ion active.

Figure 1A:
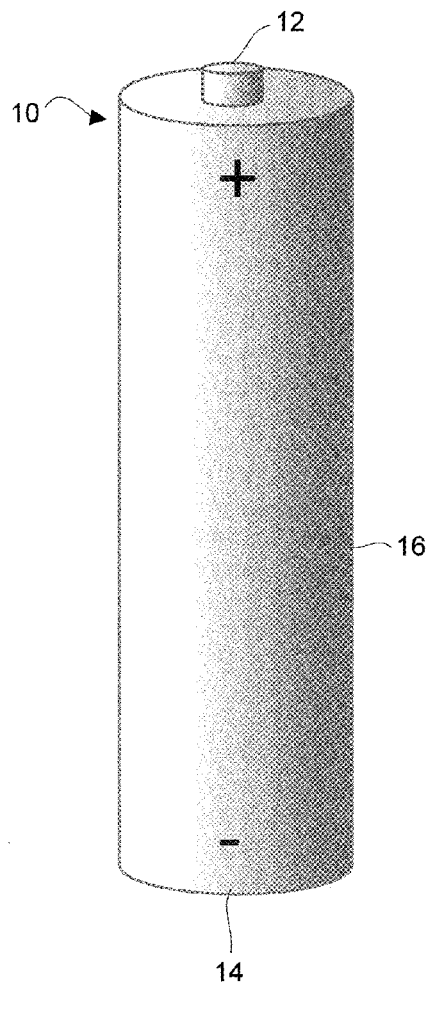
FIGS. 1A-1B illustrate a battery according to the present invention.
Figure 1B:
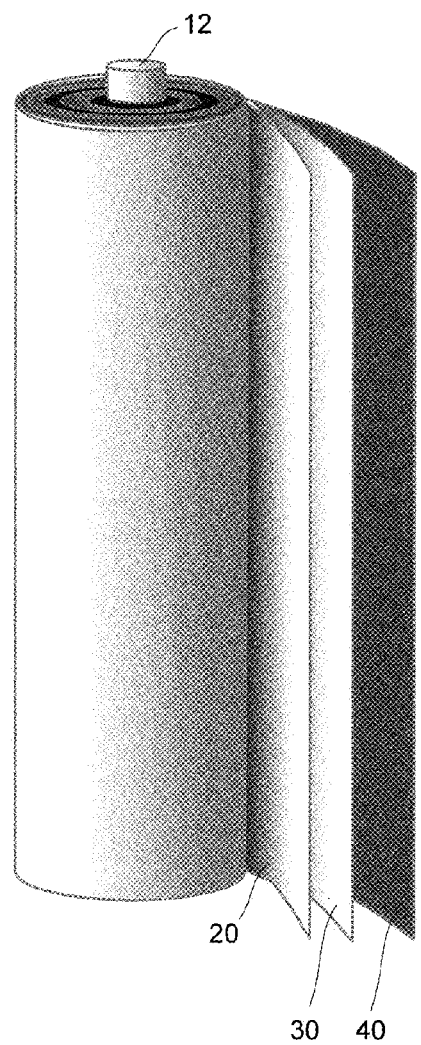

FIGS. 1A-1B illustrate a battery 10 according to the present invention. The battery 10 may be, for example, a cylindrical-type 3.7-3.8V secondary (rechargeable) battery in 18650 size. However, one skilled in the art would understand that the invention is not limited to this particular battery types, size or voltage. The features of the present invention may be employed in any number of different battery types, sizes, or voltages, whether standard or custom. The invention is applicable to various secondary ion batteries. In preferred embodiments, the battery 10 is a lithium (Li) ion battery or a sodium (Na) ion battery. The battery 10 may also be a magnesium (Mg) ion or potassium (K) ion battery.

The exemplary battery 10 includes a top portion with a positive terminal 12 and a bottom portion with a negative terminal 14. As shown in FIG. 1B, the battery 10 further includes a cathode 20, at least one separator 30, and an anode 40, each wound around one another inside a cover 16. The cathode 20 and anode 40 are connected to the positive 12 and negative 14 terminals, respectively. The cathode 20 may be, for example, LiFePO$_4$, nickel cobalt aluminum (NCA), or nickel manganese cobalt (NMC), though not limited thereto. Other exemplary materials for the cathode 20 are discussed above. As one skilled in the art would understand, when charging the battery 10, ions (e.g., lithium, sodium, etc.) travel from the cathode 20 to the anode 40 while, during the battery discharge, the ions travel from the anode 40 to the cathode 20.

The anode 40 comprises alloy of tin (Sn), germanium (Ge), and/or antimony (Sb). The anode 40 is preferably a thin film-based ternary Sn—Ge—Sb alloy anode. In one embodiment, the ternary alloy comprises SnxGeySbz, where x+y+z=100, and x≥y or x≥z. In some embodiments, y is about equal to z. For example, the ternary alloy may be Sn50Ge25Sb25. In other embodiments, the anode 40 may be a binary Sn—Sb anode. The cathode 20 and separator 30 may be mixed with a binder and a conductivity additive (e.g., carbon black). The cathode 20, separator 30, and anode 40 are submerged in an electrolyte solution.

Figure 2A:
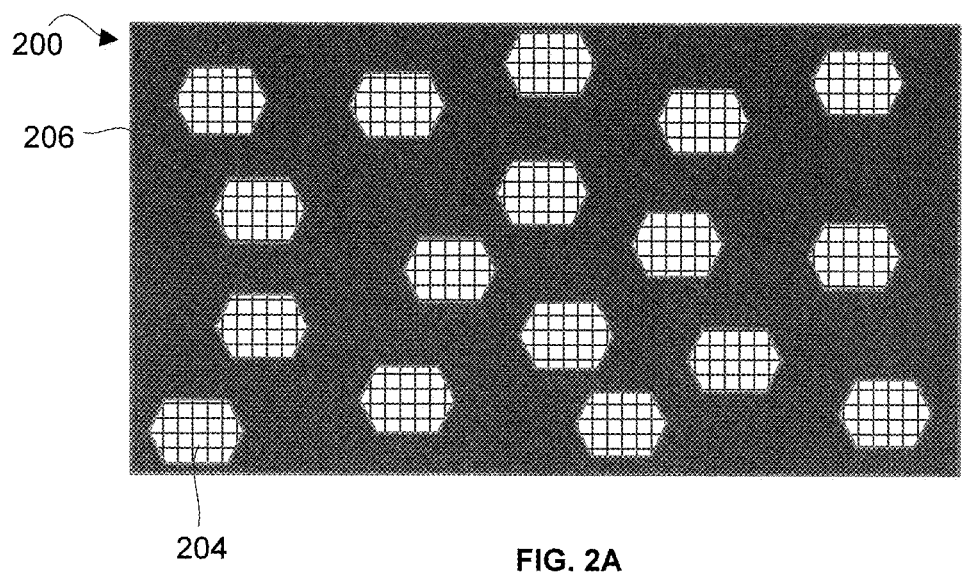
FIGS. 2A-2B illustrate anode active microstructures of the battery shown in FIG. 1.
Figure 2B:
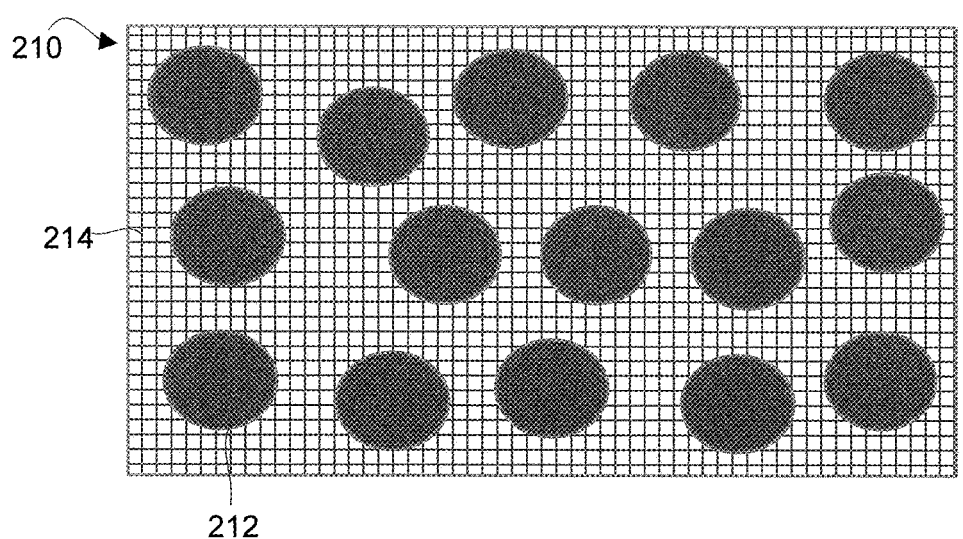

FIGS. 2A-2B illustrates exemplary anode active microstructures of the battery 10. The anodes according to the present invention includes alloys with a multiphase microstructure including (and in some embodiments consisting of) an amorphous phase and nanocrystalline phase, each of the phases being ion active. As demonstrated below, having each phase active in the anodes according to the present invention leads at least in part to significant increases in capacity. FIG. 2A shows anode active material microstructure 200 with nanocrystallites 204 dispersed in an amorphous matrix 206. FIG. 2B shows anode active material microstructure 210 with amorphous phase(s) 212 dispersed in a nanocrystalline matrix 214.

In order to better understand the role of each element in determining the electrochemical properties of the system and to obtain baselines for clear comparisons, elemental Ge, Sb, and Sn and binary Sn—Ge and Sb—Ge alloys were evaluated. The results demonstrated a highly promising reversible capacity and rate capability in the claimed ternary alloys. These findings permit the design of improved formulations of electrode materials in bulk, using methods such as powder co-mechanical milling and rapid solidification.

Exemplary ternary alloys according to the present invention include, for example, Sn80Ge10Sb10, Sn60Ge20Sb20, Sn50Ge25Sb25, and Sn33Ge33Sb33. The measured reversibly capacities of Sn80Ge10Sb10, Sn60Ge20Sb20, Sn50Ge25Sb25, and Sn33Ge33Sb33 are 728, 829, 833, and 669 mAhg$^{-1}$. With the exception of Sn80Ge10Sb10, these values are considerably above the weighted average combination of the elemental capacities, which should be 800, 743, 714, and 664 mAhg$^{-1}$, respectively. Thus, surprisingly, the alloys according to the present invention achieve charge storage capacity exceeding a rule of mixture capacity of the individual elements therein.

In one preferred embodiment, Sn50Ge25Sb25 demonstrates the best overall cycling performance, with 662 mAhg$^{-1}$ of capacity remaining after 50 cycles. This alloy also offers exquisite rate capability, delivering a stable cycling capacity of 658 and 381 mAhg$^{-1}$ at 850 and 8500 mAg$^{-1}$, respectively. Convention transmission electron microscopy (TEM) and high-resolution transmission electron microscopy (HRTEM) was used to investigate the materials' cycling microstructures. In one embodiment, the microstructure comprises a composite of about 10 to about 15 nm Sn and Ge(Sn) crystals nanodispersed in an amorphous matrix (see FIG. 2A). The capacity enhancement may be due at least in part to the unique ability of Ge nanocrystallites that are heavily alloyed with Sn to sodiate beyond the 1:1 Ge:Na (369 mAhg$^{-1}$) ratio previously reported for pure Ge electrodes.

Combined time-of-flight secondary ion mass spectrometry (TOF-SIMS), electron energy loss spectroscopy (EELS) TEM, and focused ion beam (FIB) analysis demonstrates substantial Na segregation within the film near the current collector interface that is present as early as the second discharge, followed by cycling-induced delamination from the current collector.

Figure 3:
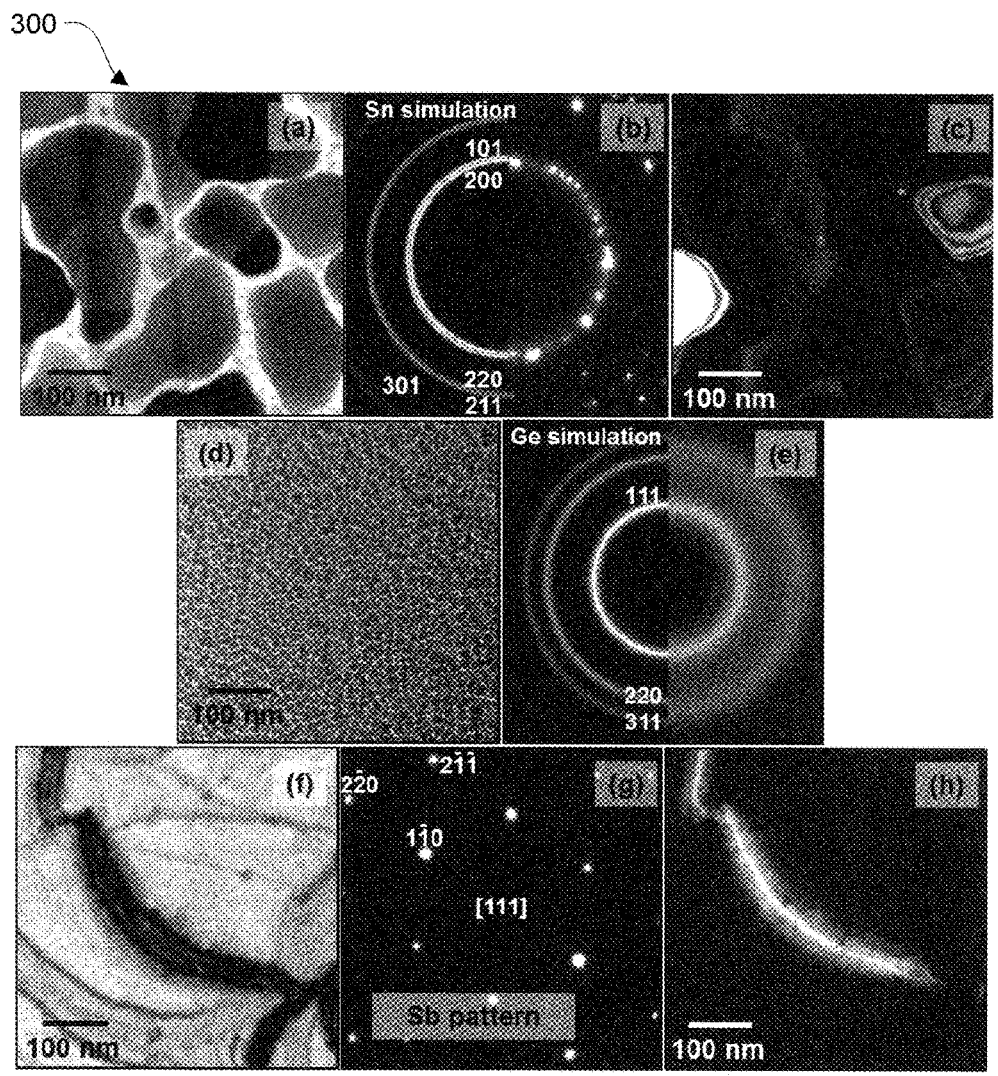
FIG. 3 shows transmission electron microscopy (TEM) micrographs of as-deposited tin (Sn), germanium (Ge), and antimony (Sn) thin films.

TEM images 300 of as-deposited 100 nm thick elemental films are shown in FIG. 3. Images (a), (d), and (f) are bright-field images and images (b), (e), and (f) are corresponding SAD patterns. As-deposited Sn, as shown in images (a) to (c), is composed of relatively large crystallites of various orientations. As sputtered pure Ge, as shown in images (d) to (e), is diffraction amorphous (i.e., amorphous, nanocrystalline, or a combination of the two), as evidenced by the washed-out selected area diffraction (SAD) ring pattern. As-deposited Sb film is continuous and polycrystalline, with the grain size being large enough to generate single-crystal SAD patterns when the smallest field-limiting aperture is employed as shown in images (f) to (h).

Figure 4:
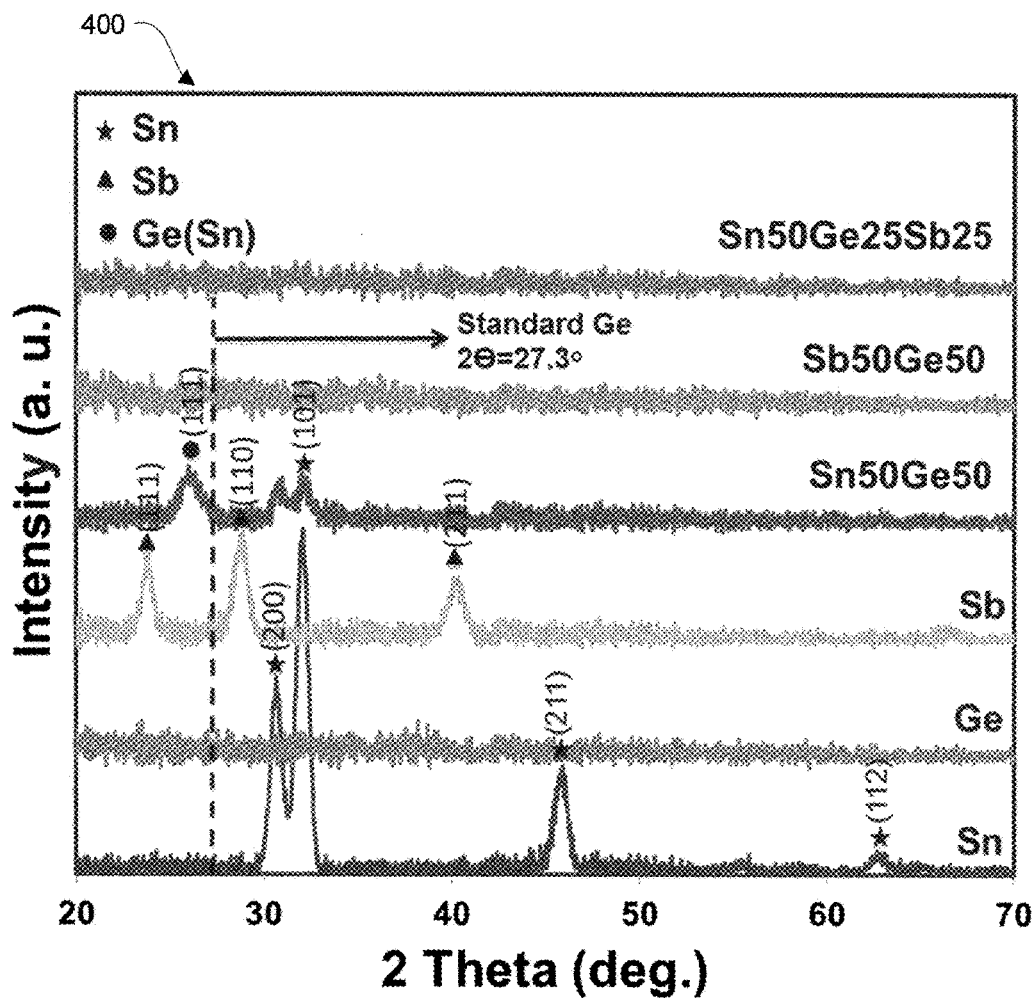
FIG. 4 shows indexed x-ray diffraction (XRD) patterns of as-deposited elemental and alloyed thin films.

The crystallinity of pure Sn and Sb and the amorphous/nanocrystalline structure of Ge are confirmed by XRD analysis, as shown in FIG. 4. These results are in good agreement with previous studies on Sn, Ge, and Sb films.

Figure 5:
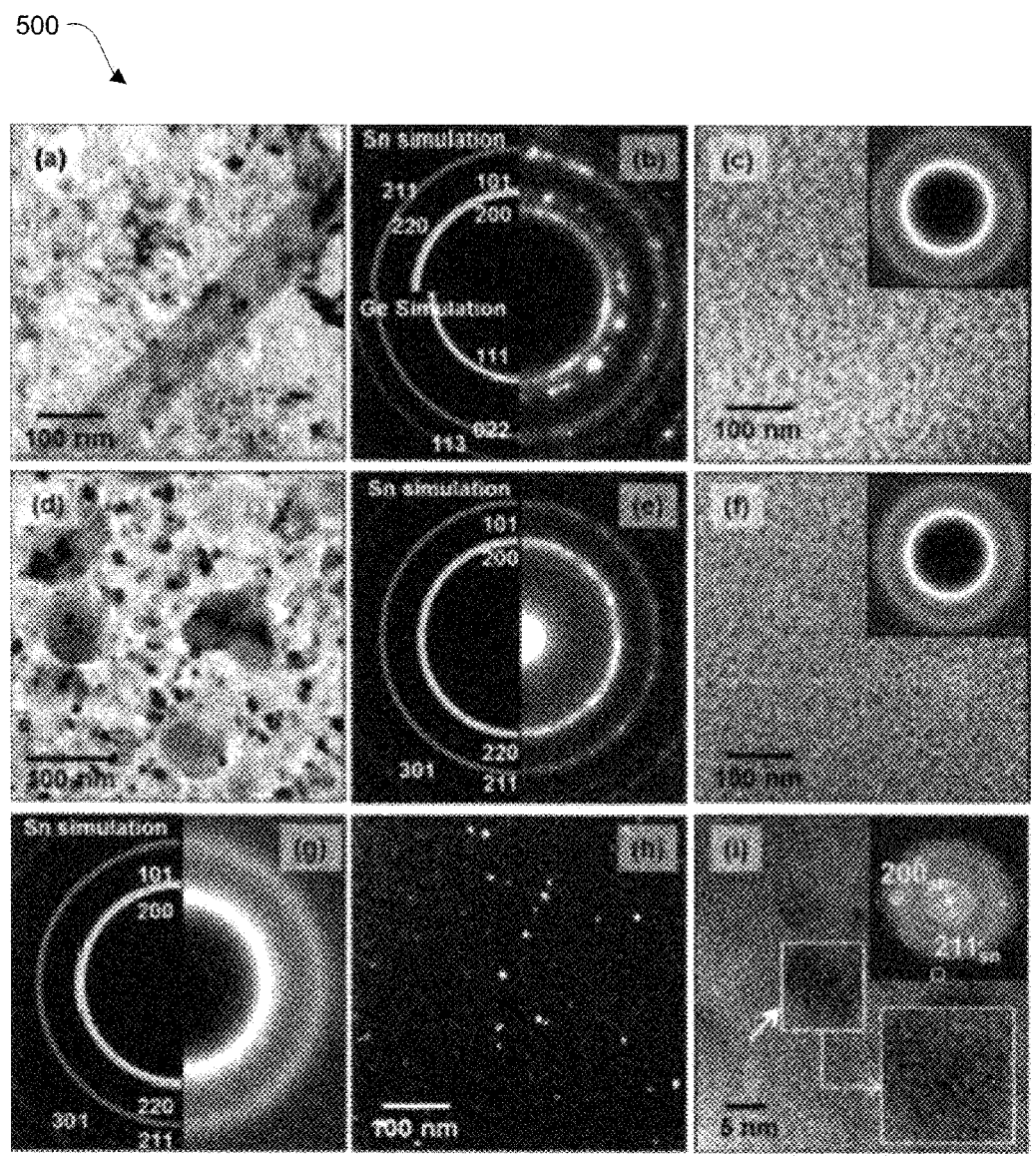
FIG. 5 shows TEM analyses of as-synthesized alloys including Sn50Ge50, Sb50Ge50, Sn80Ge10Sb10, Sn33Ge33Sb33, and Sn50Ge25Sb25.

FIG. 5 shows images 500(*a*)-(*i*) of TEM analyses of as-synthesized alloys including Sn50Ge50, Sb50Ge50, Sn80Ge10Sb10, Sn33Ge33Sb33, and Sn50Ge25Sb25. Images (a)-(b) show TEM micrographs and the indexed SAD pattern of the as-synthesized Sn50Ge50 alloy, which is a two-phase nanocomposite. Polycrystalline Sn is detected, as the (200), (101), and (211) Sn diffraction rings are visible in the SAD pattern. Two additional reflections belonging to Ge are also present. The associated d-spacings for the (111) and (220) Ge rings are expanded by ~6% with respect to elemental Ge, indicating that there is extended substitutional solid solubility of Sn in Ge, likely much beyond the equilibrium 1%. XRD analysis of the as-synthesized materials, shown in FIG. 4, confirms this shift in the Ge lattice parameter. As is marked in FIG. 4, the equilibrium position of the Ge (111) reflection (the film is highly textured) should be at 2θ=27.30°, whereas it is located at 2θ=25.70°, corresponding to a 6% shift in the lattice parameter, which is the same as measured by TEM.

Image (c) in FIG. 5 presents TEM analysis of the as-deposited Sb50Ge50. The equilibrium Sb—Ge phase diagram demonstrates negligible room-temperature solubility and no intermediate phases. However, as evidenced by the SAD pattern, co-sputtering of Sb and Ge results in the formation of an amorphous alloy with the broad rings corresponding to the first and the second nearest neighbors. This conclusion is also confirmed by the XRD pattern of this alloy shown in FIG. 4.

Images (d)-(e) of FIG. 5 show the Sn80Ge10Sb10 microstructure, which consists of nanocrystalline Sn with no evidence of Ge or Sb precipitates. TEM analysis of Sn33Ge33Sb33 is presented in image (f). Analysis of Sn50Ge25Sb25 is shown in images (g)-(i). The Sn33Ge33Sb33 alloy appears amorphous, while Sn50Ge25Sb25 has a two-phase structure consisting of an amorphous phase and nanocrystalline Sn. The Sn nanocrystals may be imaged in dark field (image (h)) and by HRTEM (image (i)).

The Sn-rich side of the ternary Sn—Ge—Sb diagram includes or consists of a mixture of Sn, SbSn, and Ge phases with appreciable mutual solubility. However, no crystalline phases besides Sn were detected. This means the rest of the material will consist of an amorphous matrix that may be compositionally homogeneous or segregated.

The trend of larger amounts of the amorphous phase with greater GeSb content can be better understood by analyzing the glass-forming ability (GFA) of all three binary alloys, i.e., GeSb, SnGe, and SnSb. From previous studies of co-sputtered films of GeSb, SnGe, and SnSb, it is found that both GeSb and SnSb films deposited over a wide range of compositions possess an amorphous microstructure, while SnGe does not exhibit an amorphous phase at any of the studied compositions (also confirmed in the data). Moreover, the GFAs of GeSb and SnSb alloys are found to be highest when both components are in roughly equal proportion (i.e., ~50 at. % Sb).

As such, the highest fraction of amorphous phase is expected when both the Sn/Sb and Ge/Sb ratios are close to 1. For the exemplary films considered in this study the Ge/Sb ratio is always fixed at 1, while the Sn/Sb ratio approaches 1 as the GeSb content is increased relative to Sn. Specifically the condition of both Sn/Sb and Ge/Sb ratios being equal to 1 is satisfied at Sn33Ge33Sb33, which is found to consist completely of amorphous phase. However, in general, the present invention is not limited to any particular ratios between any of the three elements. Functional anodes may be fashioned from a wide range of compositions. However, preferred embodiments may have specified ratios as described herein, or as derived from the within description.

Figure 6:
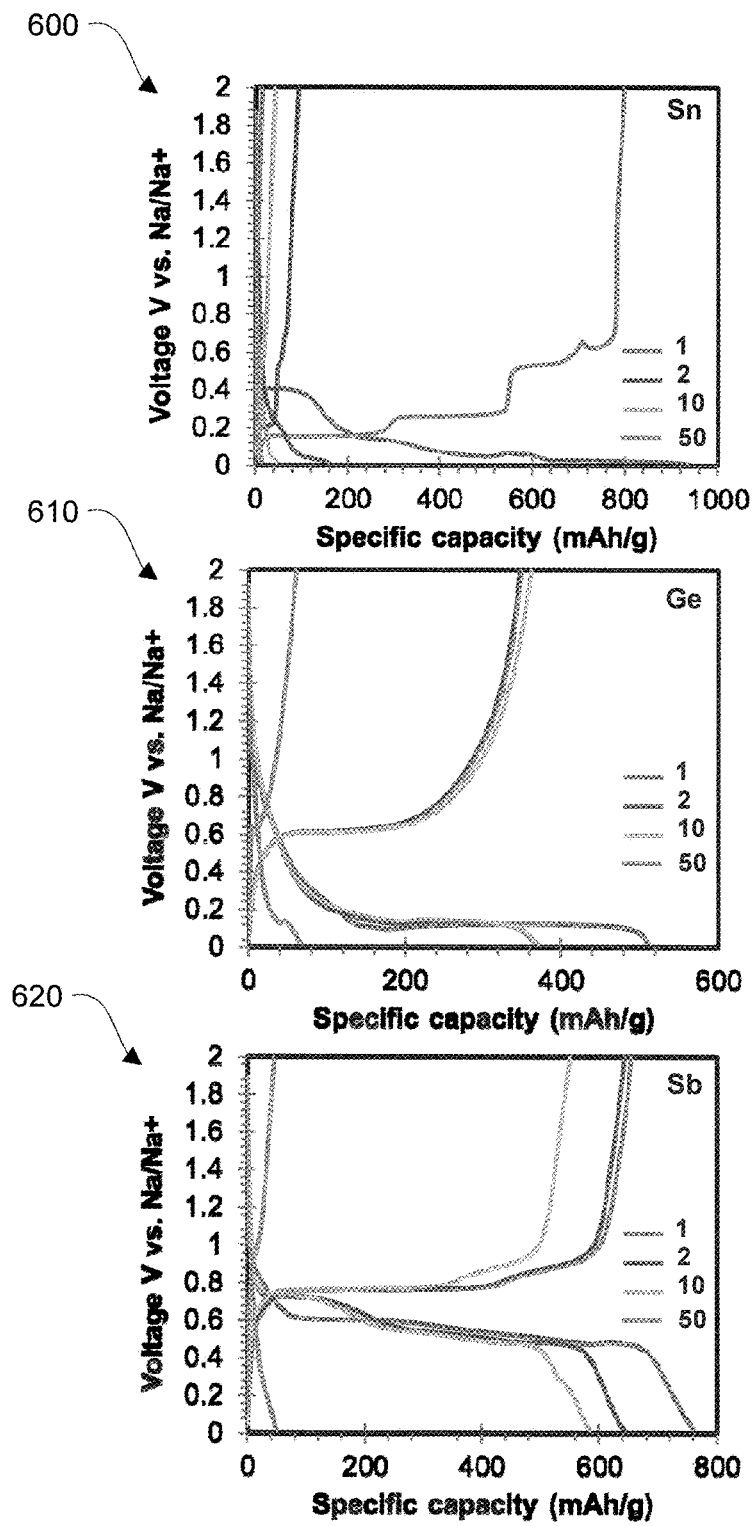
FIG. 6 shows constant current (CC) voltage profiles of elemental films.

Graphs 600, 610, and 620 of the sodiation behavior of the elemental films are shown in FIG. 6. Pure Sn was tested at 85 mAg$^{-1}$ (graph 600), Ge was tested at 110 mAg$^{-1}$ (graph 610), while Sb was tested at 120 mAg$^{-1}$ (graph 620). For pure Sn the reversible capacity drops to 38 mAhg$^{-1}$ after only 10 cycles, far below its theoretical value. This agrees with previous studies on sodiation of pure Sn, where the materials degrade very rapidly during cycling. During the first sodiation process, there are four sloping plateaus at roughly 0.45, 0.18, 0.08, and 0.03 V, although the only equilibrium phase that is observed to form electrochemically is Na$_{15}$Sn$_4$. Upon charging, the plateaus are at approximately 0.15, 0.28, 0.55, and 0.63 V. The plateaus become less distinct with cycling.

The reversible capacity of Ge is 349 mAhg$^{-1}$, being close to a 1:1 ratio of Na/Ge (369 mAhg$^{-1}$) and agreeing with a previous report. The voltage profile of Ge presents an initial sharply sloping plateau during the first and subsequent sodiation cycles from ~1 V down to 0.1-0.15 V, followed by a flat plateau at 0.1-0.15 that remains until complete discharge. There is a large hysteresis in the charge/discharge behavior, with the flat desodiation plateau being at 0.6 V during charge. The reversible capacity of Sb is 650 mAhg$^{-1}$, which is close to the theoretical 660 mAhg$^{-1}$.

In the pure Sb films, the voltage profiles show two sloping plateaus during sodiation, centered around 0.75 and 0.55 V (see graph 620). Only two stable intermetallics, NaSb and Na$_3$Sb, are known in the Na—Sb system. Intermediate phases may be possible, as the voltage profile is not sharp enough to confirm or negate their presence. During desodiation, two plateaus are observed at around 0.78 and 0.85 V. The voltage profiles along with the TEM analysis of the postcycled microstructure indicate that the desodiated Sb film is still crystalline after 10 cycles. Both elemental Ge and elemental Sb degrade during cycling, though not at a rate as fast as Sn. The sodiation voltage profiles of the individual elements are generally in agreement with previous reports.

Figure 7:
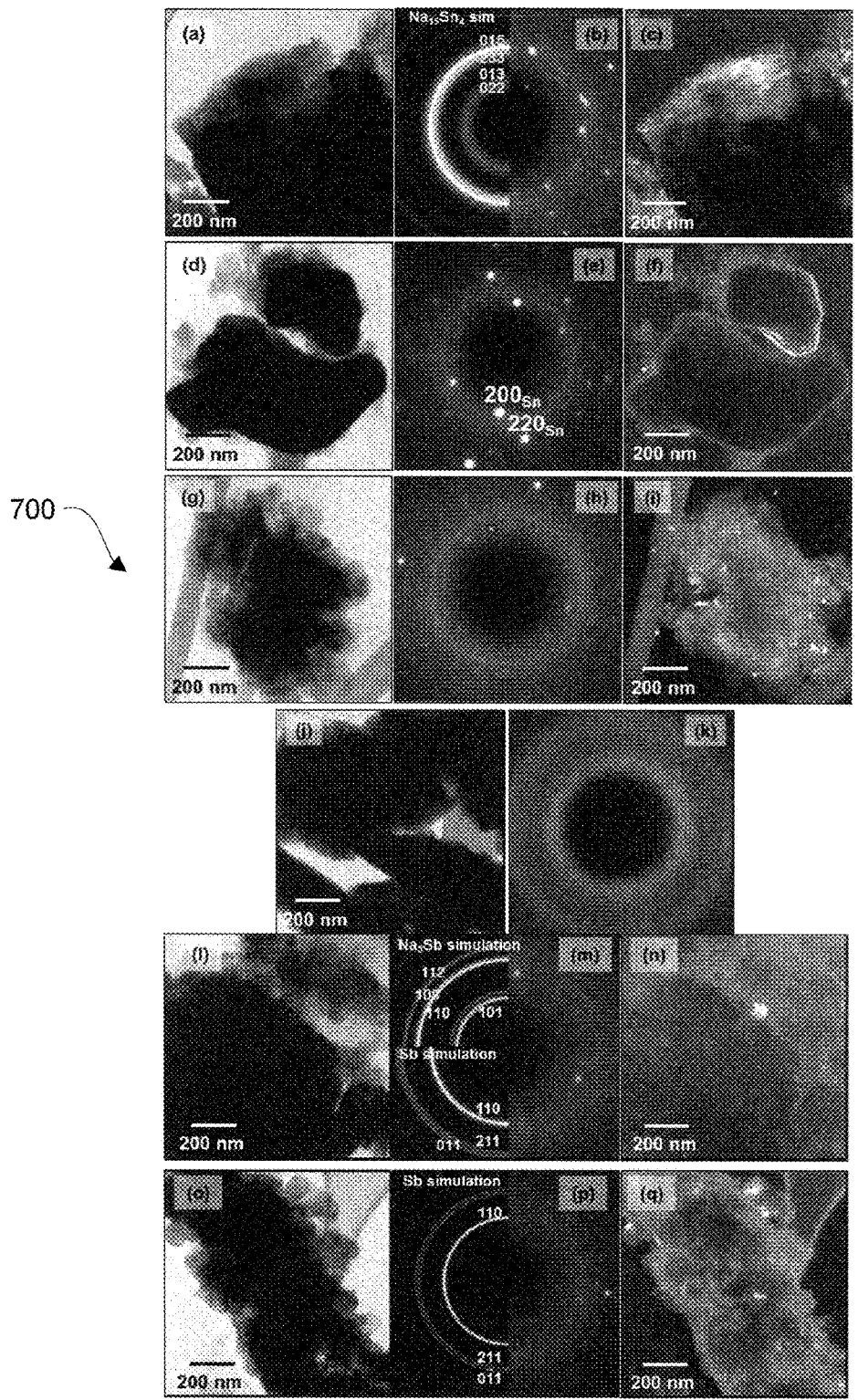
FIG. 7 shows TEM micrographs of cycled elemental Sn, elemental Ge, and elemental Sb electrodes.

FIG. 7 shows images 700(*a*)-(*q*) the TEM analysis of the cycled elemental Sn, elemental Ge, and elemental Sb electrodes. All sodiated samples are characterized after the first Na insertion, while desodiated samples are characterized after five full cycles. Images (a)-(c) show sodiated pure Sn, images (d)-(f) show desodiated Sn, images (g)-(i) show sodiated Ge, images (j)-(k) show desodiated Ge, images (l)-(n) show sodiated pure Sb, and images (o)-(q) show desodiated Sb. The dark field image in image (c) of FIG. 7 is taken using a portion of the (022) and (013) Na$_{15}$Sn$_4$ diffraction rings. The dark field image in image (f) of FIG. 7 is taken from the g=(200) Sn diffraction spot. The formation of the Na$_{15}$Sn$_4$ terminal phase is confirmed by TEM characterization of the Sn electrode discharged to 0.01 V. Desodiation leads to the formation of crystalline Sn. This is consistent with previous in situ observations.

Figure 8:
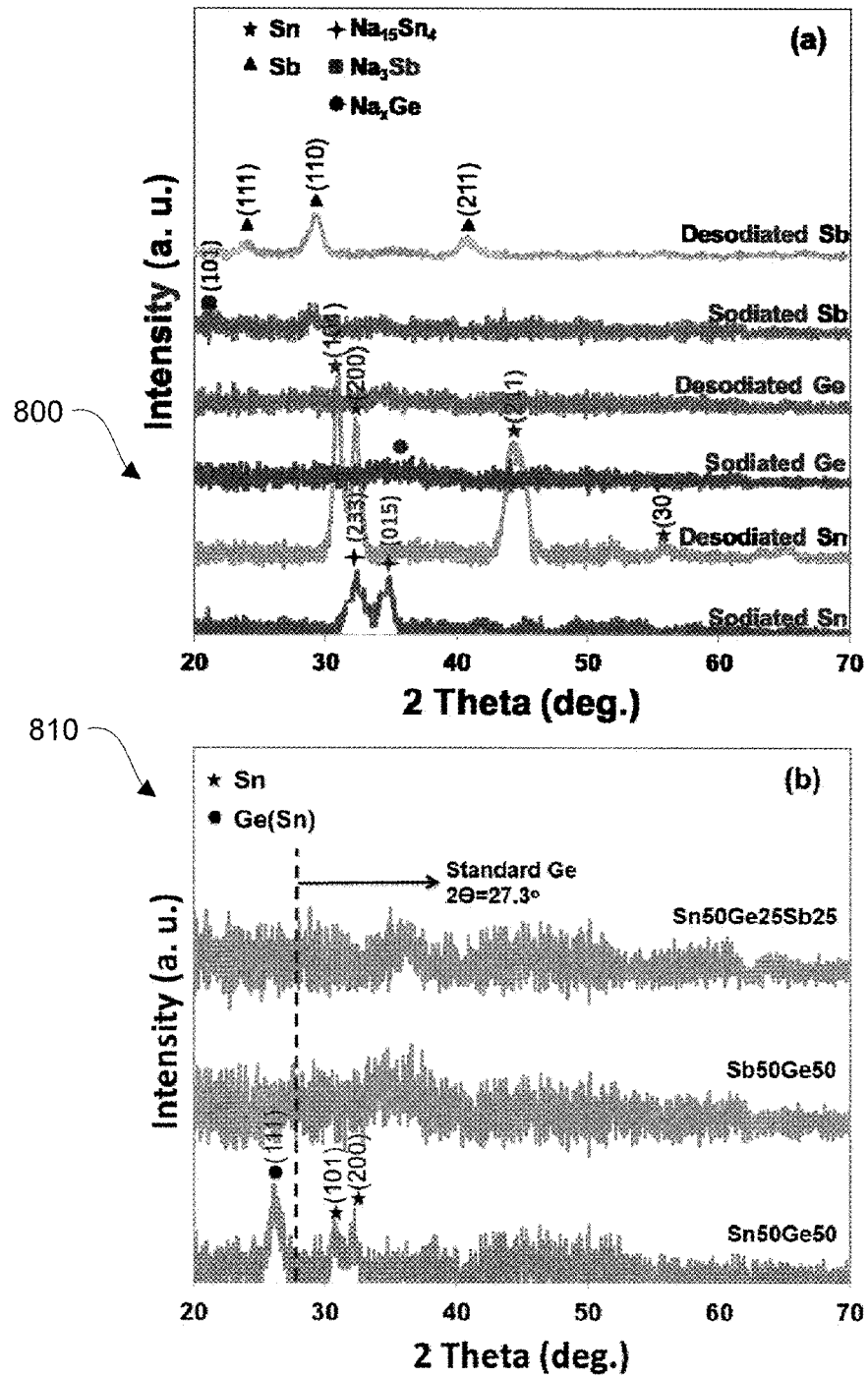
FIG. 8 shows indexed XRD patterns of sodiated and desodiated elemental thin films and desodiated binary Sn50Ge50 and Sb50Ge50 and ternary Sn50Ge25Sb25 alloys.

These findings are confirmed by XRD analysis, as presented in graphs 800 and 810 in FIG. 8. For the as-synthesized specimen, the (111), (110), and (211) peaks are respectively located at 2θ=23.77°, 28.77°, and 40.13°. For the desodiated one, these are located at 2θ=23.83°, 28.89°, and 40.39°, indicating that the crystalline structure is restored without any noticeable changes in the lattice parameter. TEM analysis indicates that the Ge electrode sodiated to 0.01 V is partially nanocrystalline, although the exact phase could not be identified. Similar to recent reports on Ge thin films, it seems that the sodiation process of Ge reaches a metastable phase that is not on the equilibrium Na—Ge phase diagram. The desodiated Ge sample is diffraction amorphous.

Figure 9:
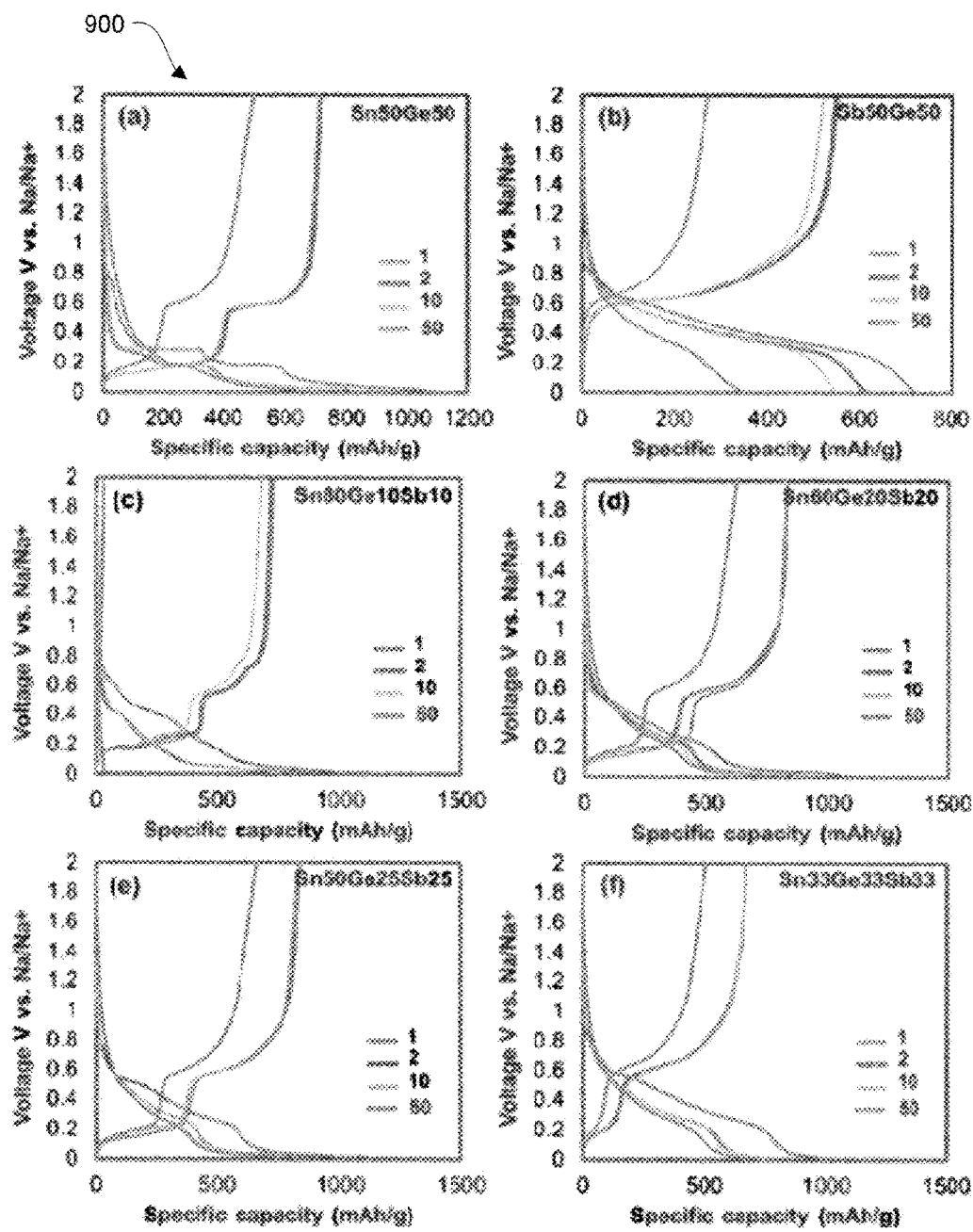
FIG. 9 shows constant current voltage profiles of binary and ternary alloys. All systems were tested at 85 mAg$^{-1}$.

FIG. 9 shows graphs 900 of the voltage versus capacity behavior for the binary and the ternary alloys, which were tested at 85 mAg$^{-1}$. The constant current voltage profile of Sn50Ge50, shown in graph (a) in FIG. 9, reveals three sloping sodiation plateaus at approximately 0.28, 0.19, and 0.03 V. The system displays two sloping desodiation plateaus near 0.16 and 0.6 V. The voltage profiles, particularly for desodiation, are nearly identical for cycles 1-10, indicating a stable microstructure. For the second to tenth cycle, Coulombic efficiency (CE) is nearly 100%, with a reversible capacity of 713 mAhg$^{-1}$. This is substantially more than what is expected based on a weighted average (the alloy is Sn-38% Ge by weight) of theoretical capacities of the elemental films (665 mAhg$^{-1}$).

The voltage profiles of Sb50Ge50 are shown in graph (b) of FIG. 9. The reversible capacity is 551 mAhg$^{-1}$, which is close to a rule of mixtures prediction (the alloy is Sb-37% Ge by weight) based on either the experimental or the theoretical values for Sb and Ge. The stable cycling voltage behavior of this alloy demonstrates a single broad monotonically de-creasing slope between 0.8 and 0.2 V upon discharge and between 0.6 and 1.2 V upon charging. The absence of sharply defined plateaus indicates that there are no two-phase regions, with each phase being energetically distinct. Rather there is a continuing variation in occupational site energies, as would be expected for a solid solution with a continuously varying Na content or with nanocrystals where a second phase is difficult to nucleate due to size effects.

The constant current voltage profiles for the Sn—Ge—Sb alloys are presented in graphs (c)-(f) of FIG. 9. At least three voltage plateaus, each with a distinct flat or sloping profile, are observed both upon charge and discharge in every alloy. Qualitatively, the voltage versus capacity profiles of the ternary systems are more similar to that of Sn—Ge than to Sb—Ge. Moreover the position and the slope of the plateaus evolve with alloy composition. The measured reversibly capacities of Sn80Ge10Sb10, Sn60Ge20Sb20, Sn50Ge25Sb25, and Sn33Ge33Sb33 are 728, 829, 833, and 669 mAhg$^{-1}$, respectively. This is an intriguing finding since the values for Sn60Ge20Sb20 and Sn50Ge25Sb25 are considerably above the weighted average of the elemental capacities. For instance one can assume the known theoretical capacity of Sn (847 mAhg$^{-1}$) and of Sb (660 mAhg$^{-1}$) and a 1:1 Na/Ge ratio (369 mAhg$^{-1}$). In that case alloys Sn80Ge10Sb10 (Sn-6 wt % Ge-10Sb), Sn60Ge20Sb20 (Sn-13 wt % Ge-22Sb), Sn50Ge25Sb25 (Sn-17 wt % Ge-28Sb), and Sn33Ge33Sb33 (Sn-23 wt % Ge-39Sb) should be 800, 743, 714, and 664 mAhg$^{-1}$, respectively.

Figure 10:
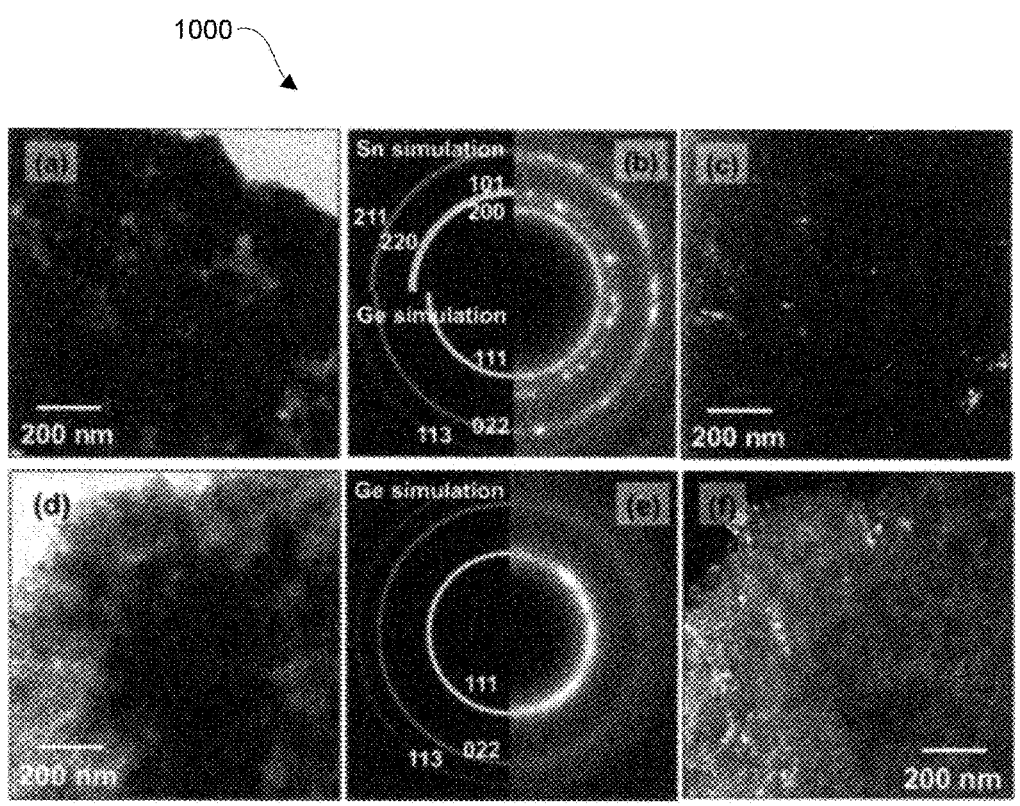
FIG. 10 shows stable cycled microstructures (10 cycles) of desodiated Sn50Ge50 and desodiated Sb50Ge50.

FIG. 10 shows TEM micrograph images 1000 for Sn50Ge50 and Sb50Ge50. Images (a)-(c) show stable cycled microstructures (10 cycles) for desodiated Sn50Ge50 including a bright field image (a), indexed SAD pattern (b), and dark field image (c) taken using a portion of the Sn (200) (101) and Ge (111) ring patterns. In (b) the Sn-induced expansion of the Ge lattice parameter has been taken into account. Images (d)-(f) show desodiated Sb50Ge50. The dark field image in (d) was taken using a portion of the Ge (111) ring.

As the TEM micrographs in images (a)-(c) of FIG. 10 demonstrate, the cycled microstructure of Sn50Ge50 contains both Sn and Ge nanocrystallites. The dark field image in image (c) of FIG. 10 highlights the nanocrystalline nature of the cycled material. The Ge nanocrystals still contain solutionized Sn, with the Ge diffraction rings being closer than the equilibrium spacing (Sn would expand the Ge lattice). From the (111) reflection, the lattice constant is estimated as approximately 5.92 Å, which is 4.77% larger than elemental Ge (5.65 Å). From measurements of the nearest-neighbor distance in Ge-20 at. % Sn films, 2.7 Å, it can be inferred that Sn strongly expands the Ge lattice and that the amount of dissolved Sn in the Ge phase is at maximum 10 at. % or less.

The XRD patterns of desodiated binary Sn—Ge and Sb—Ge and ternary Sn50Ge25Sb25 alloys are shown in FIG. 8. It is confirmed that Ge contains Sn in substitutional solid solution, with a comparable shift in the 2θ values of the (111) Ge XRD Bragg peaks. As is marked in FIG. 8, the equilibrium position of the Ge (111) reflection (the film is highly textured) should be at 2θ=27.30°, whereas it is located at 2θ=26.04°, corresponding to a 4.8% shift in the lattice parameter. The broad background intensity in the TEM SAD indicates that there is also substantial presence of an amorphous phase. This is reasonable as the initially fully amorphous alloy is expected to decompose relatively slowly at room temperature, especially concomitantly with the insertion/extraction of Na ions.

As images (d)-(f) in FIG. 10 demonstrate, the desodiated Sb50Ge50 microstructure includes or consists of a dense distribution of Ge nanocrystallites embedded in an amorphous matrix. For the case of Sb—Ge, the Ge crystallites, they have a lattice parameter at the equilibrium value, demonstrating negligible solutionizing of Sb. This is the key difference between the Sn—Ge and Sb—Ge, where in the latter case the Sb atoms are unable to remain in Ge substitutional solid solution during cycling, which leads us to conclude that that observed Ge lattice expansion in the Sn—Ge—Sb alloy is likewise due to the effect of Sn.

Figure 11:
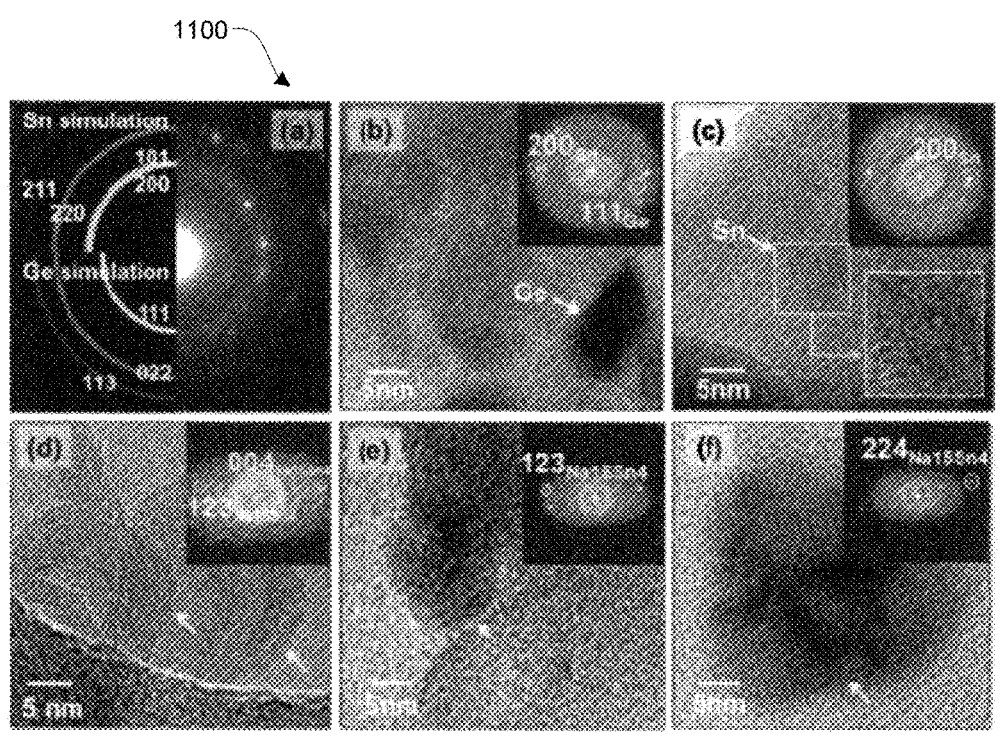
FIG. 11 shows SAD and HRTEM micrographs of desodiated Sn50Ge25Sb25 after 10 cycles, sodiated Sn50Ge25Sb25, and sodiated Sn80Ge10Sb10.

FIG. 11 shows SAD and HRTEM micrographs of desodiated Sn50Ge25Sb25, sodiated Sn50Ge25Sb25, and sodiated Sn80Ge10Sb10. In particular, images (a)-(c) show SAD and HRTEM micrographs of desodiated Sn50Ge25Sb25 after 10 cycles. HRTEM analysis in (b) and (c) highlights the 5 nm diameter Sn and Ge nanocrystallites dispersed within an amorphous matrix. Image (d) shows desodiated Sn50Ge25Sb25 and images (e)-(f) show sodiated Sn80Ge10Sb10, which contains coarser and more spherical Na$_{15}$Sn$_4$ particles and no evidence of a separate Ge phase.

Image (a) in FIG. 11 presents the SAD pattern of a steady-state microstructure of the desodiated Sn50Ge25Sb25 alloy after 10 cycles. Although the sample was X-ray amorphous (graphs 810 in FIG. 8), it was possible to resolve the crystallites in the electron diffraction patterns. The desodiated Sn50Ge25Sb25 is a multiphase nanocomposite. According to the indexed SAD pattern shown in image (a) of FIG. 11, nanocrystalline Sn is present in the material, as evidenced by the (200), (101), and (220)/(211) Sn rings. Well-identifiable ring patterns ascribed to (111), (220), and (311) Ge are present in the SAD as well, giving proof of the presence of nanocrystalline Ge. However, from a comparison of the experimental SAD pattern with a simulation, there is no evidence for crystalline Sb. Images (b)-(c) of FIG. 11 show HRTEM images of this alloy in the desodiated state after 10 cycles. The Sn and Ge nanocrystallites are densely dispersed in an amorphous matrix.

Figure 12:
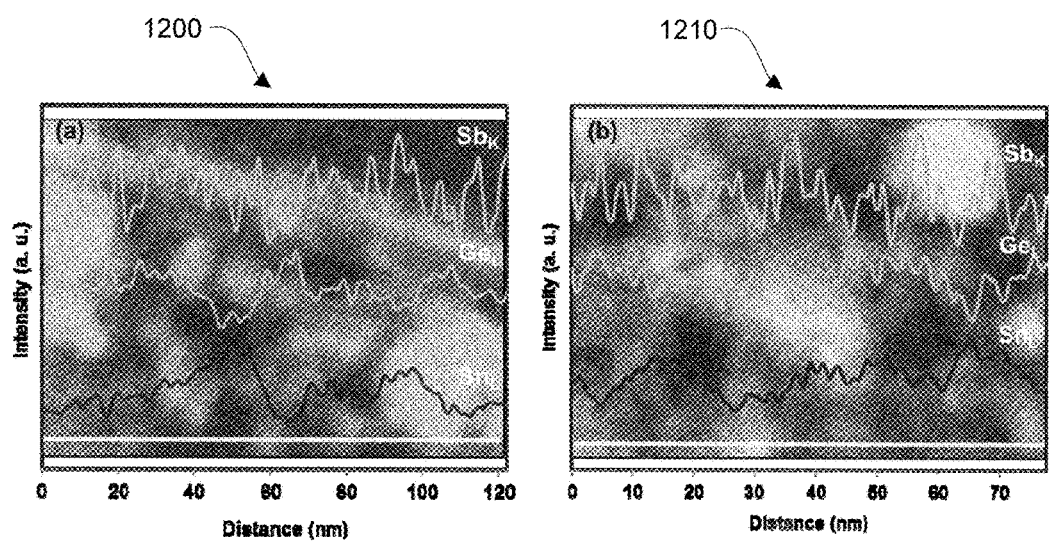
FIG. 12 shows energy dispersive spectroscopy (EDX) TEM line scans overlaid on high-angle annualar dark-field (HAADF) images of desodiated Sn50Ge25Sb25 alloy electrode after 2 cycles.

As confirmed by EDX spectroscopy, shown in FIG. 12, the amorphous matrix is a ternary alloy composed of Sn, Ge, and Sb elements. The amorphous matrix may act as a mechanically buffering phase, allowing for repeated expansion/contraction with reduced levels of localized fracture. While such effects have been achieved through intelligent design by careful chemical synthesis, here it may occur in-situ through a natural microstructural evolution.

Image (d) in FIG. 11 shows this alloy in the sodiated state, highlighting the nonspherical morphology of Na15Sn4 intermetallics. Images (h)-(i) show HRTEM analysis of the post 10 cycles sodiated Sn80Ge10Sb10. The material contains coarser and largely spherical Na15Sn4 particles, two representative crystallites being shown by arrows. There is no evidence of a separate Ge phase either from the HRTEM images or from the indexed SADs of the postcycled material (not shown). However an amorphous matrix was also observed in this specimen.

Revisiting the results shown in FIG. 9, the origin of the excess capacity can be understood beyond the theoretical rule of mixtures by first considering which alloys demonstrate it and which do not. The phenomenon is observed in Sn50Ge50 and in ternary Sn—Ge—Sb alloys of richer Ge content. It is not observed in Sb50Ge50 or in Sn80Ge10Sb10. It is unlikely that the extra capacity comes from the Sn nanocrystallites since they form the standard terminal Na$_{15}$Sn$_4$ intermetallics in all the sodiated samples. An amorphous structure per se would not produce such a capacity enhancement either: Sb50Ge50 and Sn80Ge10Sb10 also contain a large volume fraction of an amorphous phase and yet show no excess capacity beyond the rule of mixtures prediction. It was demonstrated that in Sn50Ge50 and Sn50Ge25Sb25 the Ge nanocrystals contain solutionized Sn throughout cycling, with the lattice parameter of Ge being expanded far beyond the equilibrium. Conversely, in cycled Sn80Ge10Sb10 the Ge nanocrystals are absent, while in cycled Sb50Ge50 the Ge crystallites have a lattice parameter near the equilibrium value.

The measured capacity enhancement in Sn50Ge50 and in the alloy-rich ternaries is due to the ability of Ge nanocrystallites alloyed with Sn to sodiate beyond the 1:1 Ge:Na (369 mAhg$^{-1}$) ratio previously reported for pure Ge electrodes. While a size dependence of phase transitions is experimentally well established for numerous other materials, the lack of capacity enhancement in Sb50Ge50, or in the nanocolumnar pure Ge electrode employed in a previous study, suggests that size alone will not drive Ge:Na far beyond 1:1. The equilibrium Ge—Na phase diagram contains an essentially pure Ge phase, a Ge$_4$Na intermetallic line compound, a GeNa intermetallic line compound, and a GeNa$_3$ intermetallic line compound whose crystal structure is not known. The last phase, which should thermodynamically exist after full discharge, corresponds to a capacity of 1107 mAhg$^{-1}$. The fact that the capacity of pure Ge never approaches this value may be a kinetic limitation, normally associated with slow diffusion and/or insurmountable nucleation barriers during room-temperature solid-state phase transformations.

The cycling charge-discharge curves for the ternary alloys show well-defined voltage plateaus, which are typically attributed to energetically distinct two-phase regions. However it is unlikely that the individual ~10 nm nanocrystallites are able to accommodate a phase boundary per se. Thus the two-phase voltage plateau may correspond to a crystallographic dependence of the individual crystallites fully transforming to their sodiated structure. In other words, at a given time the particles with the favorable surface crystal faces/directions will be fully sodiated, while the rest will be unsodiated. A nanocrystalline Ge precipitate with Sn in substitutional solid solution may allow for facile nucleation of one or several $Na_xGe_y$ phases that are inaccessible in the pure state, even if it is not possible to fully reach the 1:3 stoichiometry. Moreover, the surrounding amorphous matrix may provide a fast ion diffusion path during sodiation/desodiation, markedly accelerating the kinetics and thus allowing the system to adsorb/release more sodium for a given charge cycle. Such a dependence of the total reversible capacity on rate kinetics is known for hydrogen storage materials, where the same hydride but with an improved catalyst will actually store more hydrogen per sorption cycle.

Figure 13:
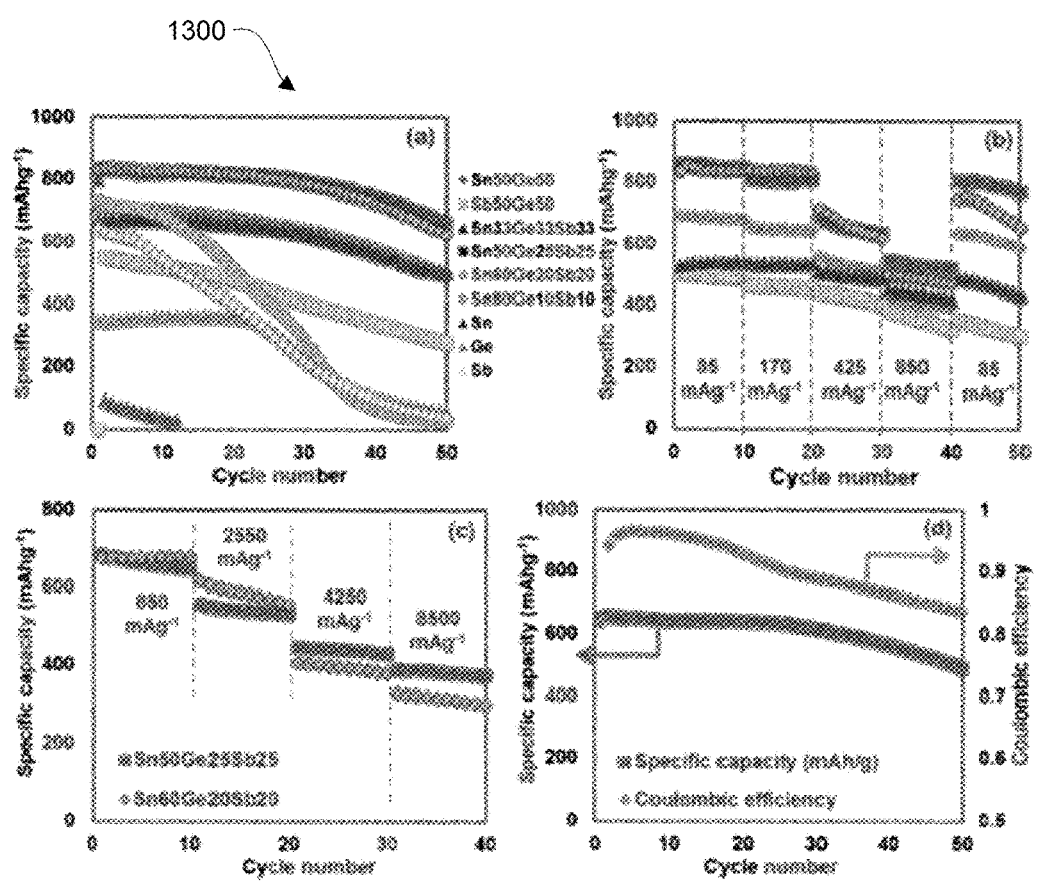
FIG. 13 shows specific capacity versus cycle number for all materials, rate capability of binary and ternary alloys, and specific capacity and Coulombic efficiency versus cycle number for Sn50Ge25Sb25 electrode cycled at 425 mAg$^{-1}$ (~0.5 C).

FIG. 13 shows specific capacity versus cycle number for all materials, rate capability of binary and ternary alloys, and specific capacity and Coulombic efficiency versus cycle number for Sn50Ge25Sb25 electrode cycled at 425 $mAg^{-1}$ (~0.5 C). The absolute value of the reversible capacity of all the materials examined, as a function of cycle number, is shown in graph (a) of FIG. 13.

Figure 14:
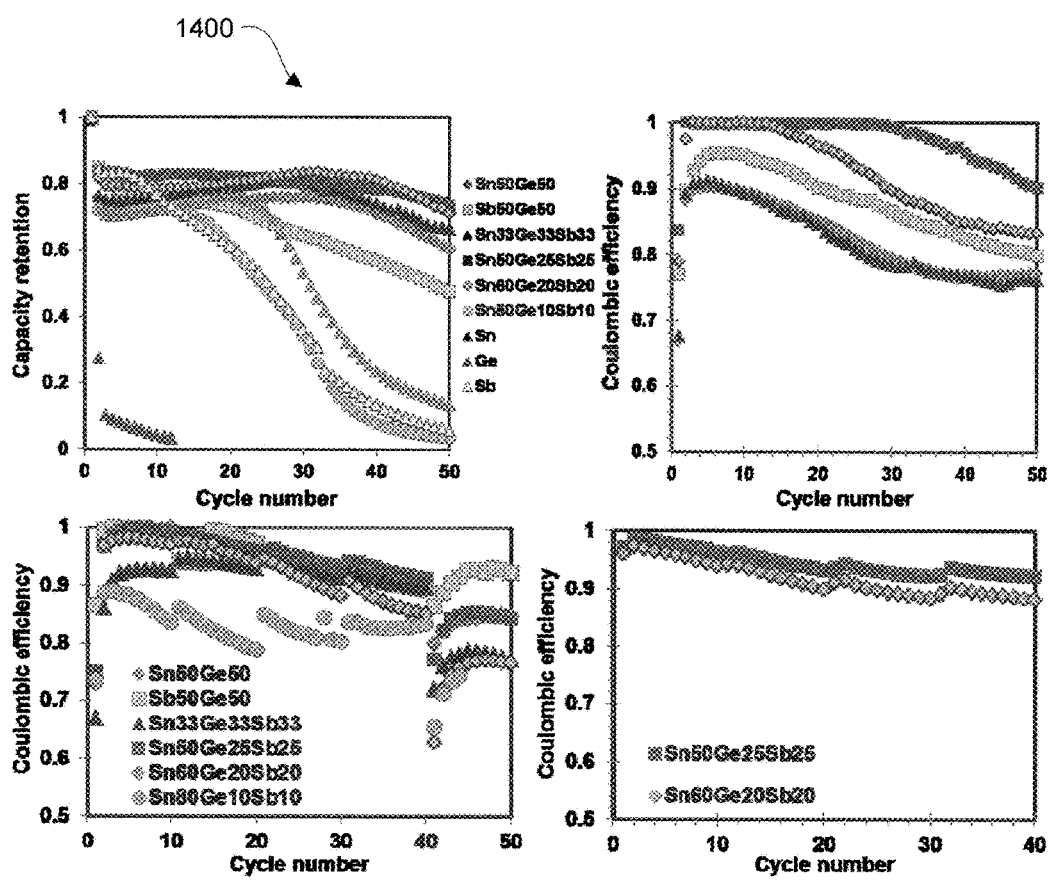
FIG. 14 shows capacity retention as a fraction of the initial value, coulombic efficiency as a function of cycle number for all materials, and coulombic efficiency associated with the rate capability results presented in FIG. 13.

The capacity retention as a fraction of the initial value is shown in graph (a) of FIG. 14, while the associated Coulombic efficiencies as a function of cycle number are shown in graph (b) of FIG. 14. Elemental Sn, Sb, and Ge, along with the initially crystalline Sn80Ge10Sb10 alloy, degrade by far the fastest. Conversely, the more alloyed systems Sn60Ge20Sb20, Sn50Ge25Sb25, and Sn33Ge33Sb33 all cycle fairly well.

Table 1 shows the Coulombic efficiency (CE) for all alloy electrodes after the first and 50th cycles at 85 $mAg^{-1}$. For the case of Sn50Ge25Sb25 the Coulombic efficiency remains close to 100% during cycles 1-30, listed in Table 2, but begins to decrease afterward, approaching 90% at cycle 50. Such CE values are on par with values reported by others for Sn and Sb elemental and alloy thin films and for Ge films. The cycling behavior of the Sn60Ge20Sb20 and Sn50Ge25Sb25 is analogous, with both alloys demonstrating similar initial and cycle 50 capacity. Likewise, the Sn33Ge33Sb33 alloy is stable, but has an overall lower specific capacity.

TABLE 1

Coulombic efficiency for all alloy electrodes after the first and 50th cycles at 85 $mAg^{-1}$

| Sample | Initial coulombic efficiency | Coulombic efficiency at $50^{th}$ cycle |
|---|---|---|
| Sn50Ge50 | 0.6697 | 0.7722 |
| Sb50Ge50 | 0.7698 | 0.7982 |
| Sn33Ge33Sb33 | 0.6757 | 0.7612 |
| Sn50Ge25Sb25 | 0.8369 | 0.9021 |
| Sn60Ge20Sb20 | 0.7890 | 0.8323 |
| Sn80Ge10Sb10 | 0.7000 | — |

TABLE 2

Coulombic efficiency of Sn50Ge25Sb25 thin film electrode for the first 30 cycles at 85 $mAg^{-1}$

| Cycle number | Coulombic efficiency |
|---|---|
| 1 | 0.8369 |
| 2 | 0.9996 |
| 3 | 0.9988 |
| 4 | 0.9984 |
| 5 | 0.9989 |
| 6 | 0.9984 |
| 7 | 0.9979 |
| 8 | 0.9978 |
| 9 | 0.9987 |
| 10 | 0.9987 |
| 11 | 0.9977 |
| 12 | 0.9983 |
| 13 | 0.9977 |
| 14 | 0.9988 |
| 15 | 0.9979 |
| 16 | 0.9983 |
| 17 | 0.9985 |
| 18 | 0.9981 |
| 19 | 0.9989 |
| 20 | 0.9988 |
| 21 | 0.9979 |
| 22 | 0.9988 |
| 23 | 0.9988 |
| 24 | 0.9987 |
| 25 | 0.9981 |
| 26 | 0.9985 |
| 27 | 0.9988 |
| 28 | 0.9969 |
| 29 | 0.9961 |
| 30 | 0.9934 |

Electrode failure may be related to several mechanisms. Failure of sodiated Ge electrodes is not well documented in the literature. However for the elemental systems such as Sn and Sb, a common source of failure is the occurrence of repeated crystallization events. This leads to an anisotropic stress at two-phase boundaries, especially at the substrate/electrode inter-face. Of Ge, Sn, and Sb elements, Sn is more likely to undergo such transitions. In addition, Sn has the largest volume expansion, with ~425% upon complete sodiation to $Na_{15}Sn_4$. The related stresses would drive the delamination of the electrode from the support for a variety of current collector geometries.

Figure 15:
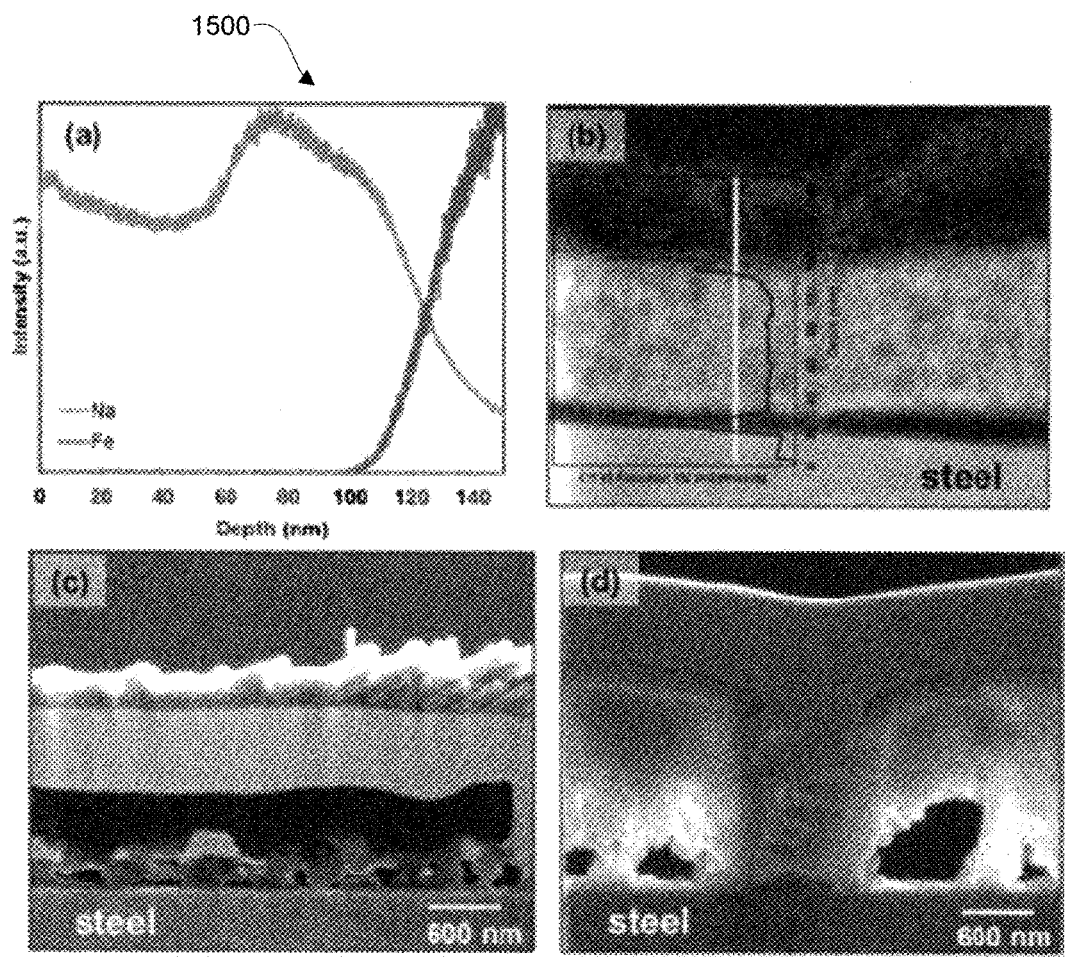
FIG. 15 shows a TOF-SIMS depth profile of Na and Fe concentration through the thickness of sodiated Sn50Ge25Sb25 alloy film on stainless steel substrate after the second sodiation, an HAADF image and thickness-corrected EELS elemental line scan of Na in Sn50Ge25Sb25 after the second sodiation, and FIB cross-sections SEM images of pure Sn and Sn50Ge25Sb25 alloy electrodes after 50 cycles.

Another contributor to loss of electrical contact is a potential chemical segregation-induced weakening of the electrode-current collector interface. It has recently been reported calculations demonstrating that sodiation of pure Sn phases leads to elastic softening corresponding to a 75% deterioration of the elastic moduli. Moreover, for the case of lithium ion battery anodes, failure of similar "film-on-support"-type architectures (Si on Cu) has been both experimentally and theoretically proven to be critically related to a weakening of the mutual interface, in turn due to Li segregation and a change in bonding. The results shown in FIG. 15 are the first direct experimental confirmation of this phenomenon in regard to sodiated (rather than lithiated) systems. Image (a) in FIG. 15 shows a TOF-SIMS depth profile of Na and Fe concentration through the thickness of a sodiated Sn50Ge25Sb25 alloy film on a stainless steel substrate after the second sodiation cycle. Clear Na segregation to the film-steel current collector interface is observed. The HAADF image and thickness-corrected EELS elemental line scan of Na in Sn50Ge25Sb25 after a second sodiation again clearly confirm these segregation phenomena (image (b) in FIG. 15).

FIG. 15 also shows FIB cross-section SEM images of (c) pure Sn and (d) Sn50Ge25Sb25 alloy electrodes after 50 cycles. Both films show some delamination from the current collector, but with the case for pure Sn being substantially more severe. In fact according to the FIB image shown, almost the entire pure Sn film is lifted off the current collector, with only the rightmost section in the image making electrical contact.

Upon sodiation, the ternary alloys all undergo an expansion of roughly 300-400%, depending on their total capacity. The alloys have the following approximate characteristics. Sn33Sb33Ge33: 103.3 g mol$^{-1}$ atoms, max reversible capacity 669 mAhg$^{-1}$, 2.6 Na atom$^{-1}$; Sn50Sb25Ge25: 108.0 g mol$^{-1}$ atoms, max reversible capacity 833 mAhg$^{-1}$, 3.4 Na atom$^{-1}$; Sn60Sb20Ge20: 110.1 g mol$^{-1}$ atoms, max reversible capacity 829 mAhg$^{-1}$, 3.4 Na atom$^{-1}$; Sn80Sb10Ge10: 114.4 g mol$^{-1}$ atoms, max reversible capacity 728 mAhg$^{-1}$, 3.1 Na atom$^{-1}$. From a calculation based on the molar volume of each alloy and the molar volume of Na (23.78 cm3 mol$^{-1}$) the following expansion values are obtained: Sn33Sb33Ge33, 280%; Sn50Sb25Ge25, 380%; Sn60Sb20Ge20, 380%; Sn80Sb10Ge10, 340%.

Thus, it can be concluded that the alloys with the highest capacity also undergo the largest expansion upon sodiation and that the cycling lifetime does not depend on minimizing the volume changes. The heavily alloyed systems actually suffer less from Na-induced interfacial-softening tendency despite the fact that Na segregation still occurs. Classic metallurgical alloy design would rather contribute substitutional solid solution strengthening, an increased resistance to crystallization, and a multiphase nanocomposite microstructure that gives both strength and ductility, leading to the observed increased resistance to interfacial delamination.

One successful way to improve the cycling stability of materials with exceptionally large sodiation/lithiation expansion is to form nanocomposites with lower-expansion materials such amorphous carbon, empty space, Cu, or nanoscale films of Al and atomic-scale films of TiO$_2$ and TiN. These either buffer the massive volume changes (carbon, empty space) or mechanically scaffold (Cu, Al, TiO$_2$, TiN) the primary active material, thus preventing its disintegration. For the case of the cyclically stable ternary Sn—Ge—Sb alloys, the amorphous matrix may accomplish a similar goal, surrounding the highly Na-active Sn-alloyed Ge and unalloyed Sn nanocrystallites and mechanically preventing their loss of electrical contact with the current collector.

The electrolyte solvents used in studies of NIB anodes are generally the same as for LIB and in this case consisted of a mixture of ethylene carbonate (EC) and diethyl carbonate (DEC). The operating potential of a NIB anode is slightly more positive than for LIB but still well below the onset potential of electrolyte reduction for this type of cyclic carbonate compound, forming a so-called solid electrolyte interphase (SEI), which is very similar for Na or Li electrolyte salts. Since reduction of the solvent molecules to Na$_2$CO$_3$, Na alkyl carbonates, and Na alkoxides consumes electrons irreversibly, this will reduce the Coulombic efficiency. Indeed, the first cycle CE was found generally around 60-70%. Formation of an SEI layer will also increase the charge transfer resistance and thereby increase the overpotential and reduce the capacity that can be extracted at a given current density. For materials that exhibit high expansion upon cycling, the SEI will fracture and expose fresh material to the electrolyte, leading to a buildup of an ever thicker surface layer. SEI accumulation in cracks or voids can lead to detachment of active material from the rest of the active mass and/or delamination from a substrate. For thin films this problem is somewhat alleviated, as expansion is confined to the direction perpendicular to the substrate. Indeed, CE was found close to 100% for Sn50Sb25Ge25 in cycles 2-30. However, expansion is so severe for NIB alloying anodes (up to a factor 5.2 for pure Sn and comparable expansion ratios were estimated based on the measured capacities) that beyond cycle 30 the CE and reversible capacity starts to drop.

Modifications to the electrolyte have been highly successful in extending the lifetime of some high-expansion electrode materials. It has been shown that Si nanowires can be cycled thousands of times without significant degradation in electrolyte solvents that are highly resistant to reduction such as 1,3-dioxolane, despite 280% volume expansion. Alternatively, addition of fluoroethylene carbonate (FEC) to conventional electrolyte mixtures has also been found to increase electrode lifetime and modify the SEI layer. Compared to standard carbonate mixtures, SEI formed from FEC is found to be very thin and contain large amounts of a polyene compound that can passivate the electrode surface. High polymeric content would make the SEI more elastic compared to one composed entirely of Li salts and less prone to fracture. This is especially important for materials that expand by extremely large amounts such as the Sn and Sn-based alloys studied here. CE and cycling performance of the materials could be much improved by electrolyte modification.

Binary and ternary alloy electrodes were subjected to rate capability tests, with the results being shown in graphs (b) and (c) of FIG. 13. Capacity retention as a fraction of the measured capacities is plotted in FIG. 14. Samples in graph (b) FIG. 13 received 50 charge/discharge cycles (shown in graph (a) of FIG. 13) prior to the rate testing, while alloys in graph (c) of FIG. 13 were activated at 85 mAg$^{-1}$ for only several cycles and then rate tested. The degradation incurred in cycles 1-50 explains the capacity discrepancy at 850 mAg$^{-1}$ between the two plots. Both Sn50Ge25Sb25 and Sn60Ge20Sb20 show excellent rate capability, with capacities of 381 and 313 mAhg$^{-1}$ being retained at a charge/discharge rate near 10 C.

As shown in graph (d) of FIG. 13, the Sn50Ge25Sb25 electrode revealed an initial reversible specific capacity of 653 and 491 mAhg$^{-1}$ after 50 charge-discharge cycles at 425 mAg$^{-1}$, indicting excellent cycling performance of this alloy at a relatively high cycling rate of ~0.5 C.

Figure 16:
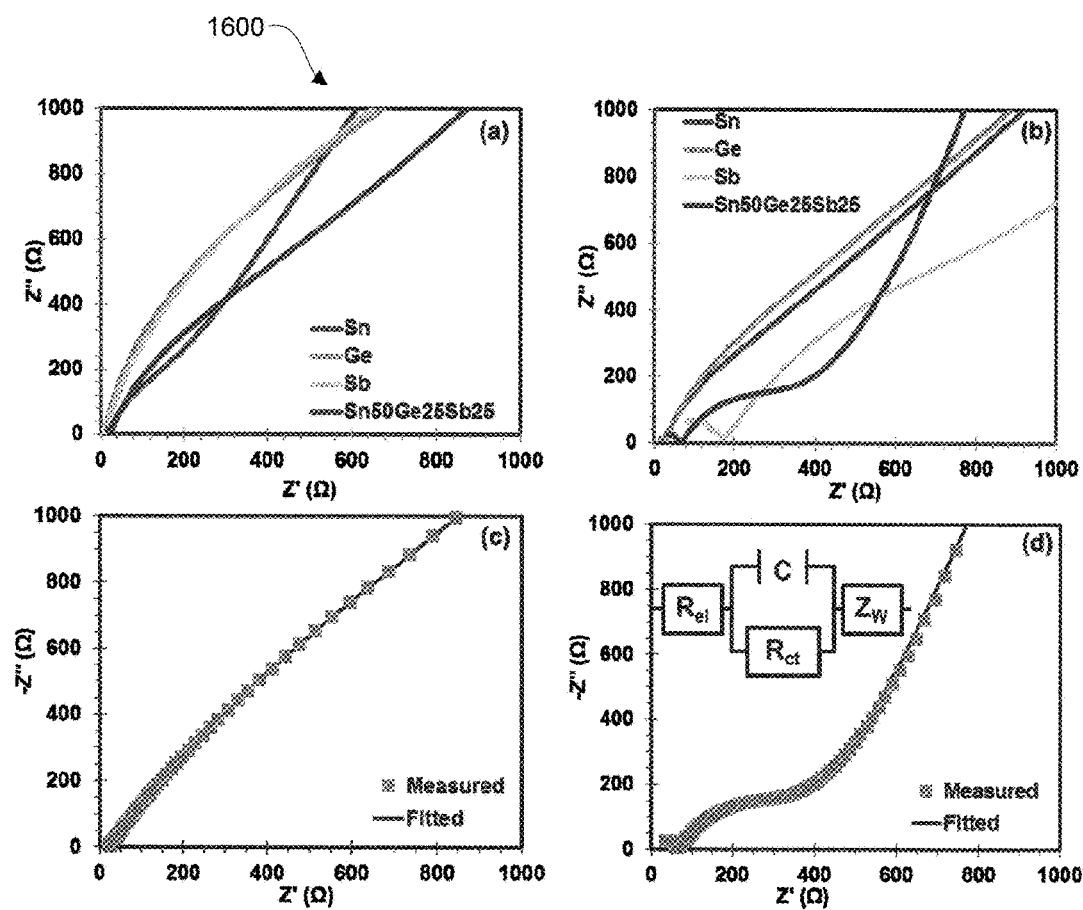
FIG. 16 shows impedance spectra of elemental and alloy Sn50Ge25Sb25 thin film electrodes in an as-made state and a cycled state after 50 cycles, and impedance spectra of Sn50Ge25Sb25 in an as-made state and a cycled state with corresponding simulation based on the equivalent circuit shown in insets.

The electrochemical impedance spectra (EIS) Nyquist plots of the Sn50Ge25Sb25 alloy in the as-synthesized state and after 50 cycles at 85 mAg$^{-1}$ are shown in FIG. 16. Image (a) shows elemental and alloy Sn50Ge25Sb25 thin film electrodes in an as-made state and image (b) shows a cycled state after 50 cycles. Image (c) shows an as-made state and image (d) shows a cycled state with corresponding simulation based on the equivalent circuit shown in insets. As indicated in graph (b) of FIG. 16, cycled Sn50Ge25Sb25 has a low equivalent series resistance but that is generally on par with the elemental electrodes. This implies that the fast rate capability of the alloy is attributable to the facile phase transformation kinetics, rather than to an enhanced electrical conductivity of the material per se. It is instructive to compare the performance of the Sn—Ge—Sb electrodes with the best systems reported in the scientific literature.

Table 3 compares anodes according to the present invention with the state-of-the-art in previously published research on Sn-based NIB anode materials. It can be concluded that Sn50Ge25Sb25 and Sn60Ge20Sb20 electrodes exhibit promising capacity-rate capability combinations, with performance at 10 C being especially desirable.

TABLE 3

| Electrodes | Cycling Capacity mAhg$^{-1}$ (current density) | | | Rate Capability mAhg$^{-1}$ (current density) | |
| --- | --- | --- | --- | --- | --- |
| | 1$^{st}$ | 10$^{th}$ | 50$^{th}$ | | |
| Sn50Ge25Sb25 | 833 | 821 | 662 | 658 | 381 |
| Sn60Ge20Sb20 | 829 | 826 | 625 | 675 | 313 |
| | (85 mAg$^{-1}$) | (85 mAg$^{-1}$) | (85 mAg$^{-1}$) | (850 mAg$^{-1}$) | (8500 mAg$^{-1}$) |
| | (55 mAcm$^{-2}$) | (55 mAcm$^{-2}$) | (55 mAcm$^{-2}$) | (550 mAcm$^{-2}$) | (5500 mAcm$^{-2}$) |
| | (0.1 C) | (0.1 C) | (0.1 C) | (1 C) | (10 C) |
| Sn/C Nanocomposite[75] | 470 | 270 | N/A | N/A | N/A |
| | (50 mAg$^{-1}$) | (50 mAg$^{-1}$) | | | |
| Sn—Cu Nanocomposite[37] | ~250 | ~420 | ~460 | 182 | 126 |
| | (169 mAg$^{-1}$) | (169 mAg$^{-1}$) | (169 mAg$^{-1}$) | (847 mAg$^{-1}$) | (1694 mAg$^{-1}$) |
| Sn—SnS—C Composite[38] | ~430 | ~425 | ~450 | ~350 | N/A |
| | (100 mAg$^{-1}$) | (100 mAg$^{-1}$) | (100 mAg$^{-1}$) | (800 mAg$^{-1}$) | |
| Sn—C Composite[38] | ~240 | ~280 | ~220 | ~150 | N/A |
| | (100 mAg$^{-1}$) | (100 mAg$^{-1}$) | (100 mAg$^{-1}$) | (800 mAg$^{-1}$) | |
| Nanocolumnar Germanium Thin Films[48] | ~480 | ~470 | ~460 | 380 | 170 |
| | (74 mAg$^{-1}$) | (74 mAg$^{-1}$) | (74 mAg$^{-1}$) | (370 mAg$^{-1}$) | (10000 mAg$^{-1}$) |
| Sb/C Fibers[41] | ~450 | ~400 | ~420 | ~300 | ~100 |
| | (100 mAg$^{-1}$) | (100 mAg$^{-1}$) | (100 mAg$^{-1}$) | (1000 mAg$^{-1}$) | (6000 mAg$^{-1}$) |
| Tin-Coated Viral Nanoforests[56] | ~770 | ~580 | ~470 | N/A | N/A |
| | (50 mAg$^{-1}$) | (50 mAg$^{-1}$) | (50 mAg$^{-1}$) | | |
| Sn Nanoparticles with Al$_2$O$_3$ Nanoglue [91] | ~620 | ~680 | N/A | N/A | N/A |
| | (N/A) | (N/A) | | | |
| Sn-film electrode in NaFSA KFSA[30] | ~330 | ~300 | N/A | N/A | N/A |
| | (0.6 mAcm$^{-2}$) | (0.6 mAcm$^{-2}$) | | | |
| Mesoporous C/Sn Composite [5] | ~300 | ~250 | N/A | ~70 | ~60 |
| | (20 mAg$^{-1}$) | (20 mAg$^{-1}$) | | (800 mAg$^{-1}$) | (1000 mAg$^{-1}$) |
| Sn @ Wood Fibers[31] | ~350 | ~220 | ~250 | ~75 | N/A |
| | (84 mAg$^{-1}$) | (84 mAg$^{-1}$) | (84 mAg$^{-1}$) | (840 mAg$^{-1}$) | |
| SnSb/C Nanocomposite[4] | ~570 | ~520 | 435 | ~280 | N/A |
| | (100 mAg$^{-1}$) | (100 mAg$^{-1}$) | (100 mAg$^{-1}$) | (1000 mAg$^{-1}$) | |
| Hollow Carbon Nanowires[15] | 251 | ~250 | ~240 | 149 | N/A |
| | (50 mAg$^{-1}$) | (50 mAg$^{-1}$) | (50 mAg$^{-1}$) | (500 mAg$^{-1}$) | |
| Carbon Nanofibers[16] | ~200 | ~180 | 175 | ~80 | ~60 |
| | (200 mAg$^{-1}$) | (200 mAg$^{-1}$) | (200 mAg$^{-1}$) | (500 mAg$^{-1}$) | (2000 mAg$^{-1}$) |
| Sb—C Nanocomposite[40] | ~610 | ~600 | ~600 | ~500 | ~300 |
| | (100 mAg$^{-1}$) | (100 mAg$^{-1}$) | (100 mAg$^{-1}$) | (1000 mAg$^{-1}$) | (2000 mAg$^{-1}$) |
| Cu$_2$Sb Thin Films[44] | ~280 | ~270 | ~50 | ~230 | N/A |
| | (100 μAcm$^{-2}$) | (100 μAcm$^{-2}$) | (100 μAcm$^{-2}$) | (100 μAcm$^{-2}$) | |
| AlSb Thin Films[45] | ~490 | ~350 | ~250 | ~100 | N/A |
| | (40 μAcm$^{-2}$) | (40 μAcm$^{-2}$) | (40 μAcm$^{-2}$) | (40 μAcm$^{-2}$) | |
| Mo$_3$Sb$_7$ thin Films[46] | ~330 | ~340 | ~300 | ~300 | ~110 |
| | (0.6 mAcm$^{-2}$) | (0.6 mAcm$^{-2}$) | (0.6 mAcm$^{-2}$) | (0.6 mAcm$^{-2}$) | (18 mAcm$^{-2}$) |
| Sb/MWCNT Nanocomposite[47] | ~500 | ~500 | ~450 | ~350 | ~250 |
| | (100 mAg$^{-1}$) | (100 mAg$^{-1}$) | (100 mAg$^{-1}$) | (1000 mAg$^{-1}$) | (2000 mAg$^{-1}$) |
| SnO$_2$@MWCNT Nanocomposite [92] | ~500 | ~450 | ~380 | ~310 | N/A |
| | (N/A) | (N/A) | (N/A) | (N/A) | |
| | (0.1 C) | (0.1 C) | (0.1 C) | (0.5 C) | |
| Sb$_2$O$_4$ Thin Films[93] | ~980 | ~500 | N/A | N/A | N/A |
| | (N/A) | (N/A) | | | |
| | (0.1 C) | (0.1 C) | | | |
| Sn$_{0.3}$Co$_{0.3}$C$_{0.4}$ Nanocomposite[34] | ~400 | ~200 | N/A | N/A | N/A |
| | (N/A) | (N/A) | | | |
| | (0.04 C) | (0.04 C) | | | |
| Porous Sb/Cu$_2$Sb anode[42] | ~617 | ~600 | ~550 | ~470 | ~280 |
| | (N/A) | (N/A) | (N/A) | (N/A) | (N/A) |
| | (0.1 C) | (0.1 C) | (0.1 C) | (1 C) | (5 C) |
| SnO$_2$-RGO Nanocomposite [94] | 407 | ~500 | ~400 | ~200 | ~120 |
| | (100 mAg$^{-1}$) | (100 mAg$^{-1}$) | (100 mAg$^{-1}$) | (500 mAg$^{-1}$) | (1000 mAg$^{-1}$) |
| Cu$_6$Sn$_5$ [36] | 160 | 75 | N/A | N/A | N/A |
| | (7.9 mAcm$^{-2}$) | (7.9 mAcm$^{-2}$) | | | |
| Sn$_{25}$Cu$_{31}$C$_{44}$ [36] | 135 | 120 | 117 | N/A | N/A |
| | (0.1 C) | (0.1 C) | (0.1 C) | N/A | N/A |
| Sn$_{39}$Cu$_{46}$C$_{15}$ [35] | 350 | 330 | 160 | 465 | 337 |
| | (0.1 C) | (0.1 C) | (0.1 C) | (600 mAg$^{-1}$) | (3000 mAg$^{-1}$) |
| Sb—C nanofibers [95] | 495 | ~500 | ~500 | N/A | N/A |
| | (200 mAg$^{-1}$) | (200 mAg$^{-1}$) | (200 mAg$^{-1}$) | | |
| ALD-Al$_2$O$_3$ coated Sn nanoparticles [96] | 625 | 650 | N/A | N/A | N/A |
| | (N/A) | (N/A) | | | |

Finally it is important to point out that while physical vapor co-deposition (co-sputtering) of alloy films represents a repeatable and compositionally accurate method for rapidly screening new materials, the microstructures described herein attainable through more "bulk" methods as well. High-energy mechanical alloying and rapid solidification are two well-known techniques for achieving a range of nonequilibrium microstructures that are in-practice stable during service. Co-milling is especially effective for the relatively soft metallic systems, such as those based on Sn or Sb, that undergo significant cold-welding and interdiffusion rather than pulverizing. For instance, metastable Ge-12 atom % Sn and 34 atom % Ge substitutional solid solutions have already been synthesized by high-energy mechanical milling, although the resultant structures were not used for electrochemical purposes. Rapid solidification (melt spinning) has also been recently employed to produce metastable SnTe—Se thermoelectric alloys, as well as Sn—Ge lithium ion battery anodes with exceptional charge storage capacities and cycling stability. Neither co-milling nor rapid solidification methods suffer from practical engineering concerns of limited mass loadings or the need for planar geometries and are therefore readily scalable to the desired battery application. In order to limit phase segregation in larger structures, a fourth element possessing a strong affinity for Sn, Sb, and Ge may also be added. This was successfully achieved through the addition of S or Se into the nonequilibrium microstructures of Sn—Co—C nanocomposites, which were then sufficiently stable in bulk form as to be utilized for cyclable sodium ion battery anodes.

The following examples and description of experimental procedures are intended to exemplify certain aspects or embodiments of the invention, not to limit the claimed invention in any manner.

Target composition 100 nm films were (co)sputtered onto polished stainless steel substrates (battery spacers) at room temperature (ATC Orion 8, AJA International Inc.). Sb and Ge deposition were carried out using radio frequency-magnetron sputtering, while Sn deposition was performed by dc-magnetron sputtering. Depositions were performed with continuous substrate rotation in the presence of Ar gas with 5 N purity at a sputtering pressure of 4 mTorr, with a maximum base pressure of 5×10-8 Torr. The deposition rates were adjusted for stoichiometry, being in the range 0.04-0.39 nm $s^{-1}$. The primary approach for confirming film thicknesses depended on a series of ex situ deposition calibrations cross-checked against in situ calibrations, film weight measurements, and XPS. For a range of gun powers relevant to the deposition conditions, a series of elemental films were deposited at varying times with thicknesses up to 1.5 µm. Film thicknesses were then analyzed using a standard profilometer approach, with the deposition rate per given power being back-calculated. These results were cross-checked against an in situ deposition rate monitor held in the plane of the substrate (instead of the battery substrate), using known tooling factors for each element. To ensure that resputtering did not affect the final alloy film stoichiometry or thickness (it should not since the atomic weights of the elements are not that divergent), the weight of the alloy film was compared to the rule of mixtures weight that would be expected for the 100 nm film thickness employed for all materials. High-resolution FE-SEM was employed as a secondary confirmation tool for reporting the film thicknesses. Film compositions were further confirmed using X-ray photoelectron spectroscopy (XPS) and are listed in atomic %; for example, Sn50Ge25Sb25 is 50 atom % Sn-25 atom % Ge-25 atom % Sb.

Na half-cells were assembled using Na metal foil as the counter electrode and polyethylene separators (MTI Corporation, porosity of 36-44% and average 0.03 µm pore size); 316 stainless steel spacer disks (MTI Corporation), with a diameter and thickness of 15.8 mm and 0.5 mm, respectively, were used as the substrates for thin film deposition. Prior to deposition, the spacers were polished down to 5 µm SiC polishing paper (Allied High Tech Products, Inc.). The substrates were then cleaned by sonication in acetone, 2-propanol, and Milli-Q water and were finally dried. The spacers were weighted before and after deposition. The microbalance employed (Mettler Toledo, XP6U) had a manufacturer quoted 0.1 µg accuracy. For each composition, 3-6 samples were electrochemically tested to obtain a mean value of reversible capacity. Extended cycling testing was performed on 2 or 3 specimens per composition.

Figure 17:
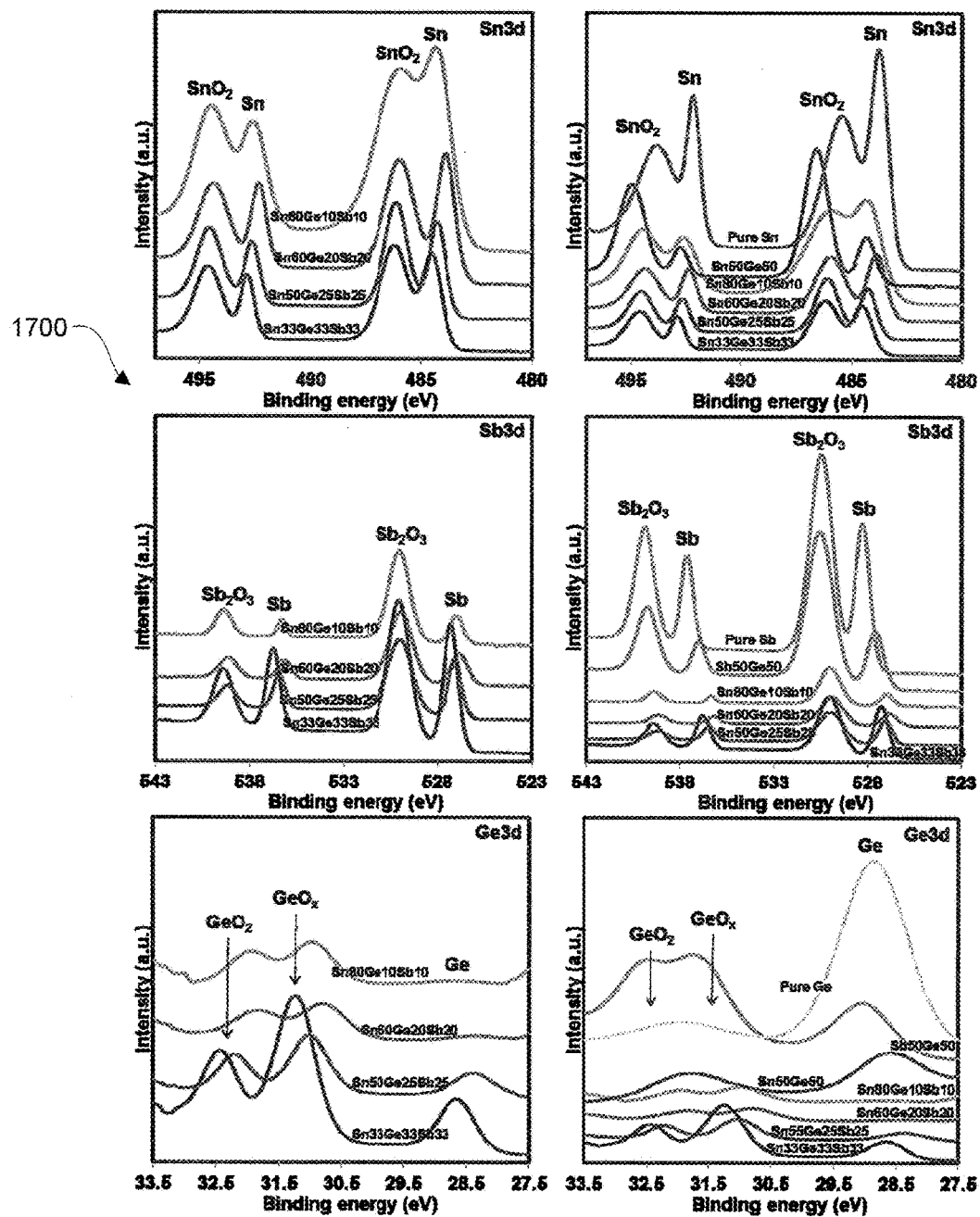
FIG. 17 shows high resolution XPS spectra of Sn3d, Sb3d, and Ge3d of as-synthesized thin films.
Figure 18:
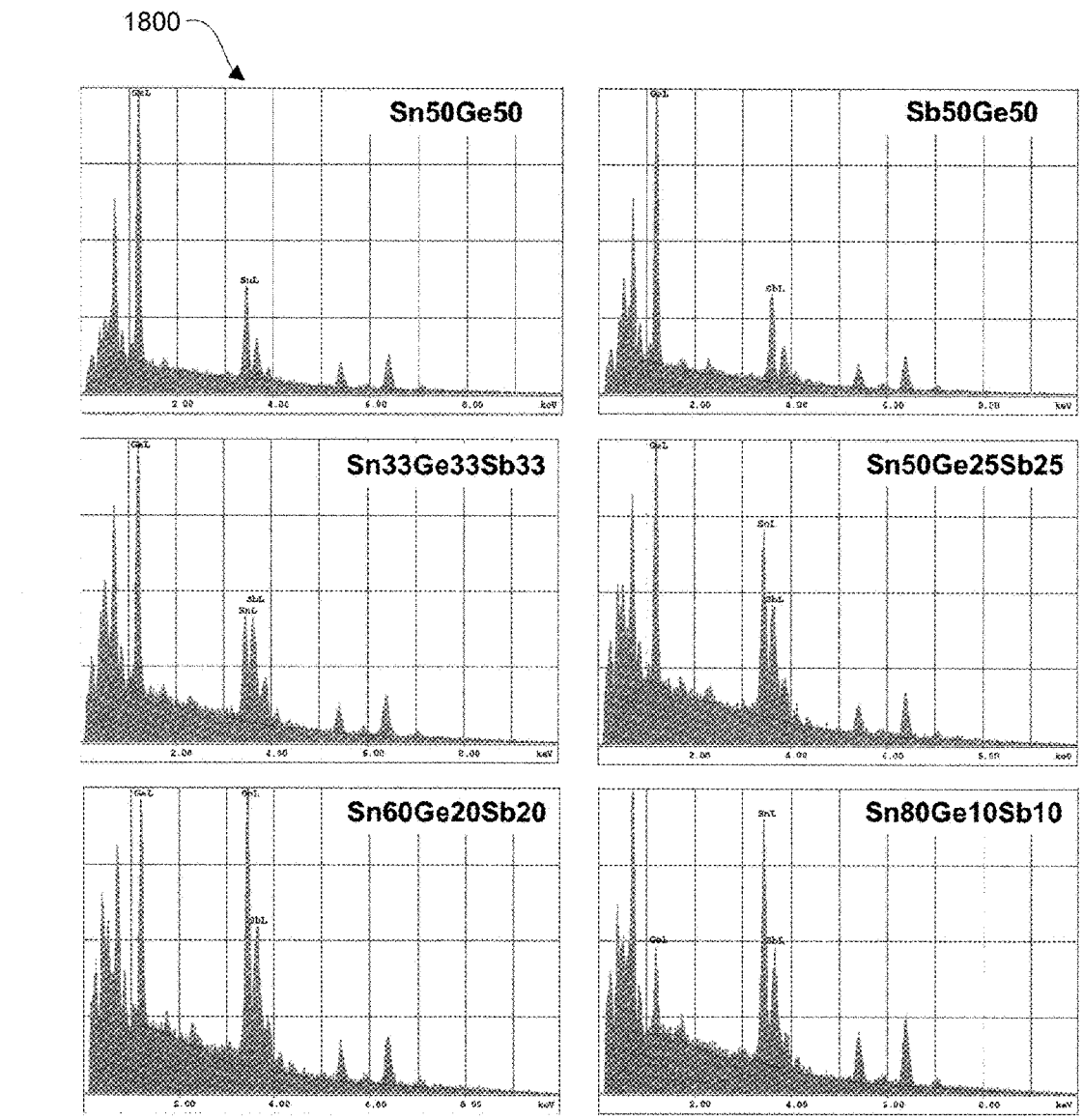
FIG. 18 shows EDXS spectra of Sn3d, Sb3d, and Ge3d of as-synthesized thin films.

Table 4 shows the average weight and standard deviation for each composition based on 6 different samples. Table 5 shows the XPS and EDXS results of as-synthesized alloy electrodes. The EDXS results contain approximately 10% error. In general more quantitative validity may be attributed to the XPS results. The raw XPS and EDXS data are shown in FIGS. 17 and 18, respectively.

TABLE 4

| Sample | Average weight (mg) | Standard deviation |
|---|---|---|
| Sb50Ge50 | 0.0883 | 0.0033 |
| Sn50Ge50 | 0.0983 | 0.0054 |
| Sn33Ge33Sb33 | 0.0898 | 0.0039 |
| Sn50Ge25Sb25 | 0.1045 | 0.0028 |
| Sn60Ge20Sb20 | 0.1093 | 0.002 |
| Sn80Ge10Sb10 | 0.1159 | 0.0014 |

TABLE 5

| | XPS results | | | EDX results | | |
|---|---|---|---|---|---|---|
| Sample | At. % Sn | At. % Ge | At. % Sb | At. % Sn | At. % Ge | At. % Sb |
| Sn50Ge50 | 48 | 52 | — | 46 | 54 | — |
| Sb50Ge50 | — | 54 | 46 | — | 54 | 46 |
| Sn33Ge33Sb33 | 33.5 | 34 | 32.5 | 32 | 36 | 32 |
| Sn50Ge25Sb25 | 51 | 24 | 25 | 50 | 30 | 20 |
| Sn60Ge20Sb20 | 60.5 | 19.5 | 20 | 59 | 23 | 18 |
| Sn80Ge10Sb10 | 77 | 12 | 11 | 76 | 12 | 12 |

As an electrolyte, 1 M sodium perchlorate (NaClO4, Alfa Aesar98-102% purity) salt in ethylene carbonate (Alfa Aesar: 99% purity)-diethyl carbonate (Alfa Aesar: >99% purity) (1:1 by volume) was used. The assembly process was carried out in an argon-filled glovebox in which oxygen and moisture con-centration levels were kept below 0.2 ppm. Galvanostatic charge-discharge tests were performed on a BT2000 Arbin potentiostat at a potential range of 0.01-2V versus Na/Nap and a constant current density. Current densities were based on the accurately measured final weight of the films. The usual definition of a reversible capacity being the capacity at first charge (desodiation) is employed. Electrochemical impedance spectroscopy measurement was conducted on a Solartron 1470E multi-channel potentiostat in a frequency range of 10 MHz to 0.01 Hz at open-circuit potential condition with an ac perturbation of 10 mV. Na batteries were disassembled in order to do post-cycling characterization of the microstructure. Cycled electrodes were soaked and rinsed in acetonitrile (Fisher Scientific, >95% purity) and kept overnight in the glovebox to remove residual electrolyte.

As-deposited and cycled samples were characterized using transmission electron microscopy (TEM; JEOL 2010 and JEOL JEM 2100, both at 200 kV). Electron diffraction patterns were simulated using the commercial software Crystal Maker and open-source software Diffraction Ring Profiler, with the input of known space group information of the relevant phases, such as Sn (I41/amd, 5.8197, 5.8197, 3.1749, Wyckoff position: 4a), Ge (Fd3m, 5.6578, 5.6578, 5.6578, Wyckoff position: 8a), Sb (R3m, 4.5066, 4.5066, 4.5066, Wyckoff position: 36i), Na15Sn4 (I43d, 13.16, 13.16, 13.16, Wyckoff positions Sn1:16c, Na1:12a, Na2:48e), and Na3Sb (P63/mmc, 5.3550, 5.3550, 9.4960, Wyckoff positions Sb1:2c, Na1:2b, Na2:12k). The diffraction ring profiler integrates the selected area diffraction ring pattern intensities to accurately calculate the center point of each ring. High resolution TEM (HRTEM) measurements were conducted using scanning TEM (STEM) (JEOL 2200FS, 200 kV) with a nominal beam size of 0.5 nm. Electron energy loss spectroscopy (EELS) analysis was also conducted using a 200 kV JEOL 2200FS scanning TEM with a nominal beam size of 0.5 nm. High-angle annular dark field (HAADF) images were also recorded. Digital Micrograph (Gatan, Inc.) was employed for signal collection and data extraction from EELS spectra. The Na spectrum was extracted by integrating over low loss edges of Na at 30-40 eV. Typical current densities for HRTEM imaging were 13.15 pA cm-2 at 400 K and 16.72 pA cm-2 at 500 K.

Crystal structures of as-deposited thin films were characterized by X-ray diffraction (XRD) on a Bruker AXS diffractometer with Cu KR radiation ($\lambda$=1.5406 Å) (Bruker Discover 8). The diffractometer is equipped with a HiStar general area two-dimensional detection system with a sample-detector distance of 15 cm. Phase identification was performed employing the XRD database on EVA software. The presented XRD patterns were obtained by subtracting the pattern of the substrate from the composite. To achieve this, XRD was performed on both the stainless steel substrate and on the deposited thin film on the substrate, employing identical scanning conditions. The mathematical subtraction was performed using EVA commercial software. Cross-sectional samples of cycled materials were obtained using a Hitachi NB5000 dual-beam focused ion beam/scanning electron microscope (FIB/SEM). To prepare FIB samples, a proper area from the bulk of the sample was selected using SEM. A thin layer of carbon and tungsten were then deposited on top of the area. Using FIB and a microsample manipulator, the selected volume was finally isolated, lifted out, and placed on a Cu five-post grid.

The as-synthesized and cycled thin films were also analyzed using EDX spectroscopy with scanning electron microscopy on a Hitachi FESEM S-5500. XPS measurements were conducted on an ULTRA (Kratos Analytical) spectrometer under ultrahigh vacuum (10-9 Torr), using monochromatic Al KR radiation (hv=1486.6 eV) operated at 210 W. The high-resolution spectra were collected with an energy window of 20 eV. The XPS data were analyzed using CasaXPS software. The sodiated Sn50Ge25Sb25 thin film electrode was depth analyzed using a time-of-flight secondary ion mass spectrometery (TOF-SIMS) instrument (ION-TOF GmbH). The analysis chamber was kept at a pressure of less than 5×10-9 mbar, and a 25 kV Bipion source was used for analysis. For sputtering, 1 kV O2$^+$ ions with a current of ~34 nA were also used with the rate of ~0.06 nm/s. The analysis and sputtering areas were 40 µm×40 and 200 µm×200 µm, respectively.

Prior to XRD, XPS, and TOF-SIMS analysis the samples were covered and sealed with Parafilm in a glovebox to avoid exposure to air. Next, the airtight sample holder was transferred to the XRD instrument for measurement of the XRD patterns. For TEM, the samples were quickly transferred into the TEM, reducing its air exposure to around 20 s. TEM analysis did not reveal excessive oxide formation on the surfaces, and quantitative HRTEM and analytical TEM was able to be performed without interference from the oxide.

As will be apparent to those skilled in the art, various modifications, adaptations and variations of the foregoing specific disclosure can be made without departing from the scope of the invention claimed herein. The various features and elements of the invention described herein may be combined in a manner different than the specific examples described or claimed herein without departing from the scope of the invention. In other words, any element or feature may be combined with any other element or feature in different embodiments, unless there is an obvious or inherent incompatibility between the two, or it is specifically excluded.

References in the specification to "one embodiment," "an embodiment," etc., indicate that the embodiment described may include a particular aspect, feature, structure, or characteristic, but not every embodiment necessarily includes that aspect, feature, structure, or characteristic. Moreover, such phrases may, but do not necessarily, refer to the same embodiment referred to in other portions of the specification. Further, when a particular aspect, feature, structure, or characteristic is described in connection with an embodiment, it is within the knowledge of one skilled in the art to affect or connect such aspect, feature, structure, or characteristic with other embodiments, whether or not explicitly described.

The singular forms "a," "an," and "the" include plural reference unless the context clearly dictates otherwise. Thus, for example, a reference to "a plant" includes a plurality of such plants. It is further noted that the claims may be drafted to exclude any optional element. As such, this statement is intended to serve as antecedent basis for the use of exclusive terminology, such as "solely," "only," and the like, in connection with the recitation of claim elements or use of a "negative" limitation. The terms "preferably," "preferred," "prefer," "optionally," "may," and similar terms are used to indicate that an item, condition or step being referred to is an optional (not required) feature of the invention.

The term "and/or" means any one of the items, any combination of the items, or all of the items with which this term is associated. The phrase "one or more" is readily understood by one of skill in the art, particularly when read in context of its usage.

Each numerical or measured value in this specification is modified by the term "about". The term "about" can refer to a variation of ±5%, ±10%, ±20%, or ±25% of the value specified. For example, "about 50" percent can in some embodiments carry a variation from 45 to 55 percent. For integer ranges, the term "about" can include one or two integers greater than and/or less than a recited integer at each end of the range. Unless indicated otherwise herein, the term "about" is intended to include values and ranges proximate to the recited range that are equivalent in terms of the functionality of the composition, or the embodiment.

As will be understood by the skilled artisan, all numbers, including those expressing quantities of reagents or ingredients, properties such as molecular weight, reaction conditions, and so forth, are approximations and are understood as being optionally modified in all instances by the term "about." These values can vary depending upon the desired properties sought to be obtained by those skilled in the art utilizing the teachings of the descriptions herein. It is also understood that such values inherently contain variability necessarily resulting from the standard deviations found in their respective testing measurements.

As will be understood by one skilled in the art, for any and all purposes, particularly in terms of providing a written description, all ranges recited herein also encompass any and all possible sub-ranges and combinations of sub-ranges thereof, as well as the individual values making up the range, particularly integer values. A recited range (e.g., weight percents or carbon groups) includes each specific value, integer, decimal, or identity within the range. Any listed range can be easily recognized as sufficiently describing and enabling the same range being broken down into at least equal halves, thirds, quarters, fifths, or tenths. As a non-limiting example, each range discussed herein can be readily broken down into a lower third, middle third and upper third, etc.

As will also be understood by one skilled in the art, all language such as "up to", "at least", "greater than", "less than", "more than", "or more", and the like, include the number recited and such terms refer to ranges that can be subsequently broken down into sub-ranges as discussed above. In the same manner, all ratios recited herein also include all sub-ratios falling within the broader ratio. Accordingly, specific values recited for radicals, substituents, and ranges, are for illustration only; they do not exclude other defined values or other values within defined ranges for radicals and substituents.

One skilled in the art will also readily recognize that where members are grouped together in a common manner, such as in a Markush group, the invention encompasses not only the entire group listed as a whole, but each member of the group individually and all possible subgroups of the main group. Additionally, for all purposes, the invention encompasses not only the main group, but also the main group absent one or more of the group members. The invention therefore envisages the explicit exclusion of any one or more of members of a recited group. Accordingly, provisos may apply to any of the disclosed categories or embodiments whereby any one or more of the recited elements, species, or embodiments, may be excluded from such categories or embodiments, for example, as used in an explicit negative limitation.

What is claimed is:

1. An anode for a battery, comprising an electrochemically active material comprising a ternary alloy of tin (Sn), germanium (Ge), and antimony (Sb), wherein the alloy comprises a multiphase microstructure including an amorphous phase and nanocrystalline phase, each of the phases being ion active.

2. The anode according to claim 1, wherein the nanocrystalline phase consists of tin (Sn) and germanium (Ge).

3. The anode according to claim 1, wherein the nanocrystalline phase includes germanium (Ge) nanocrystallites alloyed with tin (Sn).

4. The anode according to claim 3, wherein the amorphous phase is composed of tin (Sn), germanium (Ge), and antimony (Sb).

5. The anode of claim 1, wherein the ternary alloy comprises $Sn_xGe_ySb_z$, where $x+y+z=100$, and $x \geq y$ or $x \geq z$.

6. The anode according to claim 5, wherein y is about equal to z.

7. The anode according to claim 6, wherein the ternary alloy is Sn50Ge25Sb25.

8. The anode according to claim 6, wherein the ternary alloy is one of Sn60Ge20Sb20 and Sn33Ge33Sb33.

9. An anode for a battery, comprising an electrochemically active material comprising a ternary alloy of tin (Sn), germanium (Ge), and antimony (Sb),
the ternary alloy comprising a multiphase microstructure including an amorphous phase and nanocrystalline phase, each of the phases being ion active,
the ternary alloy comprising $Sn_xGe_ySb_z$, where $x+y+z=100$, and $x \geq y$ or $x \geq z$, and
the anode having a charge storage capacity that exceeds a rule of mixture capacity of individual elements tin (Sn), germanium (Ge), and antimony (Sb) comprising said anode.

10. The anode according to claim 9, wherein the nanocrystalline phase consists of tin (Sn) and germanium (Ge) and the amorphous phase includes tin (Sn), germanium (Ge), and antimony (Sb).

11. A battery, comprising:
a cathode;
a separator;
an anode, the anode comprising an electrochemically active material comprising a ternary alloy of tin (Sn), germanium (Ge), and antimony (Sb); and
an electrolyte.

12. The battery according to claim 11, wherein the alloy comprises a multiphase microstructure including of an amorphous phase and nanocrystalline phase, each of the phases being ion active.

13. The battery according to claim 12, wherein the ternary alloy comprises $Sn_xGe_ySb_z$, where $x+y+z=100$, and $x \geq y$ or $x \geq z$.

14. The battery according to claim 13, wherein y is about equal to z.

15. The battery according to claim 13, wherein the ternary alloy is one of Sn50Ge25Sb25 and Sn60Ge20Sb20.

16. The battery according to claim 11, wherein battery is a lithium-ion battery.

17. The battery according to claim 11, wherein the battery is a sodium-ion battery.

18. The battery according to claim 11, wherein the battery is one of a magnesium-ion battery and a potassium-ion battery.

19. The battery according to claim 11, wherein the nanocrystalline phase consists of tin (Sn) and germanium (Ge).

20. The battery according to claim 19, wherein the amorphous phase is composed of tin (Sn), germanium (Ge), and antimony (Sb).

21. The battery according to claim 11, wherein the alloy comprises a multiphase microstructure, wherein one of the phases is a supersaturated solid solution with a lattice parameter different from equilibrium.

22. The battery according to claim 11, wherein the alloy comprises a multiphase microstructure including at least one ion-active non-oxide, non-nitride, non-carbon phase.

23. The battery according to claim 11, wherein a charge storage capacity of said anode exceeds a rule of mixture capacity of individual elements, tin (Sn), germanium (Ge), and antimony (Sb), comprising said anode.

* * * * *